US009490111B2

(12) United States Patent
Abell et al.

(10) Patent No.: US 9,490,111 B2
(45) Date of Patent: Nov. 8, 2016

(54) MICRODROPLET IONISATION MASS SPECTROMETRY

(75) Inventors: Christopher Abell, Cambridgeshire (GB); Wilhelm T. S. Huck, Cambridgeshire (GB); Timothy Sharpe, Brugg (CH); Clive Smith, Cambridgeshire (GB); Todd Mize, Oxfordshire (GB); Carol Robinson, Oxfordshire (GB); Xin Li, Cambridgeshire (GB)

(73) Assignee: CAMBRIDGE ENTERPRISE LIMITED, Cambridgeshire (GB)

( * ) Notice: Subject to any disclaimer, the term of this patent is extended or adjusted under 35 U.S.C. 154(b) by 699 days.

(21) Appl. No.: 13/807,526

(22) PCT Filed: Jun. 30, 2011

(86) PCT No.: PCT/GB2011/051242

§ 371 (c)(1), (2), (4) Date: Mar. 11, 2013

(87) PCT Pub. No.: WO2012/001421

PCT Pub. Date: Jan. 5, 2012

(65) Prior Publication Data

US 2013/0187040 A1 Jul. 25, 2013

(30) Foreign Application Priority Data

Jul. 1, 2010 (GB) .................................. 1011019.5

(51) Int. Cl.
*G01N 24/00* (2006.01)
*H01J 49/00* (2006.01)
(Continued)

(52) U.S. Cl.
CPC ............ *H01J 49/0031* (2013.01); *H01J 49/16* (2013.01); *H01J 49/165* (2013.01); *H01J 49/26* (2013.01)

(58) Field of Classification Search
CPC .. A61K 8/068; A61K 9/107; A61K 2800/21; A61K 8/06; A61K 8/062; A61K 8/11; B01L 3/502784; B01L 2300/0864; B01L 3/502761; B01L 2300/0816; B01L 2200/0673; B01L 2300/0867; B01L 3/502792; H01J 49/16; H01J 49/26; H01J 49/0031; H01J 49/165
See application file for complete search history.

(56) References Cited

U.S. PATENT DOCUMENTS

2003/0026740 A1 2/2003 Staats
2003/0211631 A1 11/2003 Skinner et al.
(Continued)

FOREIGN PATENT DOCUMENTS

EP 1465230 A2 10/2004
EP 2153899 A1 2/2010
(Continued)

OTHER PUBLICATIONS

Fidalgo et al. "Coupling Microdroplet Microreactors with Mass Spectrometry: Reading the Contents of Single Droplets On-line", Angewandte Chemie, Supporting Information, © Wiley-VCH 2009 69451 Weinheim, Germany.*
(Continued)

*Primary Examiner* — Yelena G Gakh
(74) *Attorney, Agent, or Firm* — Foley & Lardner LLP

(57) ABSTRACT

Systems that employ microdroplets are used in embodiments for Microdroplet Electrospray Ionisation Mass Spectrometry (ESI MS). Thus, a method of detecting an analyte includes providing an oil composition comprising oil and an aqueous microdroplet comprising the analyte, the oil composition comprising a surfactant to stabilise the aqueous microdroplet in the oil composition; and performing ionisation mass spectrometry analysis of the oil composition.

31 Claims, 17 Drawing Sheets

(51) Int. Cl.
*H01J 49/16* (2006.01)
*H01J 49/26* (2006.01)

(56) References Cited

U.S. PATENT DOCUMENTS

| | | | |
|---|---|---|---|
| 2004/0229377 | A1 | 11/2004 | Chen et al. |
| 2005/0178960 | A1 | 8/2005 | Kameoka et al. |
| 2006/0022130 | A1 | 2/2006 | Bousse et al. |
| 2006/0193748 | A1 | 8/2006 | Tai et al. |
| 2007/0114385 | A1 | 5/2007 | Sarrut |
| 2007/0128078 | A1 | 6/2007 | Sarrut et al. |
| 2008/0067343 | A1 | 3/2008 | Hiroshi et al. |
| 2008/0235948 | A1 | 10/2008 | Bousse et al. |
| 2010/0018864 | A1 | 1/2010 | Sarrut et al. |

FOREIGN PATENT DOCUMENTS

| | | | |
|---|---|---|---|
| GB | 2437844 | A | 11/2007 |
| WO | WO-2004/038363 | A2 | 5/2004 |
| WO | WO 2005/019804 | A2 | 3/2005 |
| WO | WO 2007/136386 | A2 | 11/2007 |
| WO | WO 2008/021123 | A1 | 2/2008 |

OTHER PUBLICATIONS

Search Report received in connection with application No. GB1011019.5, DTD Oct. 27, 2010, 4 pgs.

International Search Report and Written Opinion; PCT/GB2011/051242; issued Aug. 24, 2011; 6 pgs.

Holt, D., et al., "Flurosurfactants for micodroplets: Interfacial tension analysis", Journal of Colloid and Interface Science, 2010, vol. 350(1), pp. 205-221.

Holt, D. et al., "Synthesis of novel fluorous surfactants for microdroplet stabilisation in fluorous oil streamers", Journal of Fluorine Chemistry, 2009, vol. 131(3), pp. 398-407.

Fidalgo, LM, et al., "Coupling Microdroplet Microreactors with Mass Spectrometry: Reading the Contents of Single Microdroplets Online", Angew Chem Int Ed Engl. vol. 48, No. 20, May 4, 2009, pp: 3665-3668; Published Online: Apr. 7, 2009.

Pei, J., et al., "Analysis of Samples Stored as Individual Plugs in a Capillary by Electrospray Ionization Mass Spectrometry", Analytical Chemistry, vol. 81, No. 15, Aug. 1, 2009, pp. 6558-6561, publication date (web): Jun. 25, 2009.

Kelly, RT, et al., "Dilution-free analysis from picoliter microdroplets by nano-electrospray ionization mass spectrometry", Angew Chem Int Ed Engl. 2009; 48(37); pp. 6832-6835; published Online: Aug. 17, 2009.

Kelly, RT, et al., "Dilution-free analysis from picoliter droplets by nano-ESI MS"; Supporting Information; Angewandte Chemie; Wiley-VCH 2009.

Holtze, C., et al., "Biocompatible surfactants for water-in-fluorocarbon emulsions", Lab Chip, 2008, vol. 8, pp. 1632-1639.

Qiang, Li, et al., "Fraction Collection from Capillary Liquid Chromatography and Off-line Electrospray Ionization Mass Spectrometry Using Oil Segmented Flow", Analytical Chemistry, vol. 82, No. 12, Jun. 15, 2010; pp. 5260-5267.

International Preliminary Report on Patentability received in connection with international application No. PCT/GB2011/051242; dtd Jan. 17, 2013, 8 pages.

International Search Report and Written Opinion received in PCT/GB2011/051242; issued Aug. 24, 2011, 10 pages.

* cited by examiner

MICRODROPLET IONISATION MASS SPECTROMETRY

CROSS REFERENCE TO RELATED APPLICATIONS

The present application is a National Stage of International Application No. PCT/GB2011/051242 filed on Jun. 30, 2011, which claims the benefit of United Kingdom Patent Application Serial No. 1011019.5, filed Jul. 1, 2010, the entire disclosures of which are incorporated herein by reference.

FIELD OF THE INVENTION

The present invention generally relates to microfluidic systems, more particularly to systems employing microdroplets, such as for Microdroplet Electrospray Ionisation Mass Spectrometry (ESI MS). Specifically, the invention relates to a method of detecting analyte, a microdroplet ionisation mass spectrometry apparatus for detecting analyte, a microdroplet chip comprising an emitter for ionisation mass spectrometry detection of analyte, an aqueous microdroplet containing analyte, oil comprising an aqueous microdroplet, a method of performing ionisation mass spectrometry of the contents of a microdroplet water-in-oil emulsion, and to apparatus for performing ionisation mass spectrometry of the contents of a microdroplet water-in-oil emulsion.

BACKGROUND TO THE INVENTION

Microdroplets show great promise as a new high-throughput technology in chemistry, biochemistry and molecular biology. Microdroplets can be generated at rates in excess of several thousands per second and accurately formulated using minute amounts of small molecules, DNA, proteins or cells. Furthermore, integrated active elements can be used to control individual microdroplets. Technology for creating, dividing, fusing, interrogating and even sorting microdroplets has already been developed.

Microdroplets are naturally self-contained microreactors that generally reduce sample loss, diffusion and cross-contamination, general issues that afflict traditional microfluidics. However, the isolated nature of microdroplets impedes physical access to their contents. Moreover, while analytical techniques such as mass spectrometry, capillary electrophoresis or liquid chromatography have been integrated with continuous flow microfluidic devices, their integration with microdroplets remains hindered.

There therefore remains a need for improved techniques for processing microdroplets such as, inter alia, to improve detection of microdroplet contents. More specifically regarding detection of an analyte or mixture of analytes in one or more microdroplets, improvements are needed such as label-independent analyte detection, faster analyte detection, increased detection sensitivity, e.g. by detection with reduced noise and/or contamination, for example to achieve a reduced minimum concentration of analyte in microdroplet that can be detected, etc. Further processing advantages may be found for example in improving flow of microdroplets containing analyte.

There are many prior art documents describing in general terms the integration of ESI-MS with microfluidic devices.

For use in understanding the present invention, we refer to the following disclosures:

- International patent application publication WO2007/136386 A2, published Nov. 29, 2007, The Regents of the University of California, inventors Wheeler, Garrell et al.;
- US patent application publication US2010/0018864 A1, published Jan. 28, 2010, Commisariat A L'Energie Atomique, inventors Sarrut and Constantin;
- US patent application publication US2005/0178960 A1, published Aug. 18, 2005, Cornell Research Foundation Inc., inventors Kameoka, Craighead;
- Holt, D., et al., "Fluorosurfactants for microdroplets: Interfacial tension analysis, Journal of Colloid and Interface Science, 2010, Vol. 350(1), pp 205-211,
- Holt, D., et al., "Synthesis of novel fluorous surfactants for microdroplet stabilisation in fluorous oil streams", Journal of Fluorine chemistry, 2009, Vol. 131(3), pp 398-407;
- "Coupling microdroplet microreactors with mass spectrometry: reading the contents of single microdroplets online", Angew Chem Int Ed Engl. 2009; 48(20):3665-8, Published Online: 7 Apr. 2009, Fidalgo L M, Whyte G, Ruotolo B T, Benesch J L, Stengel F, Abell C, Robinson C V, Huck W T;
- "Analysis of Samples Stored as Individual Plugs in a Capillary by Electrospray Ionization Mass Spectrometry", Anal. Chem., 2009, 81 (15), pp 6558-6561, publication date (web): Jun. 25, 2009, Jian Pei, Qiang Li, Mike S. Lee, Gary A. Valaskovic and Robert T. Kennedy;
- "Dilution-free analysis from picoliter microdroplets by nano-electrospray ionization mass spectrometry", Angew Chem Int Ed Engl. 2009; 48(37):6832-5, published Online: 17 Aug. 2009 Kelly R T, Page J S, Marginean I, Tang K, Smith R D;
- C. Holtze, A. C. Rowat, J. J. Agresti, J. B. Hutchison, F. E. Angilè, C. H. J. Schmitz, S. Koster, H. Duan, K. J. Humphry, R. A. Scanga, J. S. Johnson, D. Pisignano and D. A. Weitz, "Biocompatible surfactants for water-in-fluorocarbon emulsions", Lab Chip, 2008, 8, 1632-1639; and
- US patent application publication US2008/0067343 A1, published Mar. 20, 2008, Hirota et al.

Other background art is found in the following patent documents:

- US 2010/0018864A1 Lab-on-a-chip with coplanar microfluidic network and coplanar electrospray nozzle, Jan. 28, 2010;
- US 2008/0235948A1 Electrospray apparatus with an integrated electrode, Oct. 2, 2008;
- GB 2437844A, Microfluidic device for electrospraying, Nov. 7, 2007;
- US 2007/0128078A1 Lab-on-a-chip comprising a coplanar microfluidic system and electrospray nozzle, Jun. 7, 2007;
- US 2007/0114385A1 Microfluidic device comprising an electrospray nose, May 24, 2007;
- US 2006/0193748A1, Integrated LC-ESI on a chip, Aug. 31, 2006;
- US 2006/0022130A1 Microfluidic devices and methods with integrated electrical contact, Feb. 2, 2006;
- US 2005/0178960A1, Electrospray emitter for microfluidic channel, Aug. 18, 2005;
- WO 2005/019804A2 Microfluidic chip with enhanced tip for stable electrospray ionisation, 3 Mar. 2005;
- US 2004/0229377A1, Microfluidic chip system integrated with nano-electrospray interface and method using thereof, Nov. 18, 2004;

EP 1465230A2, Electrospray emitter for microfluidic channel, Oct. 6, 2004;
US 2003/0211631A1, Microfluidic devices connected to capillaries with minimal dead volume, Nov. 13, 2003;
US 2003/0026740A1, Microfluidic devices, Feb. 6, 2003;
WO2008/021123.

SUMMARY OF THE INVENTION

According to a first aspect of the present invention, there is provided a method of detecting analyte, the method comprising: providing an oil composition comprising oil and an aqueous microdroplet comprising said analyte, said oil composition comprising surfactant to stabilise said aqueous microdroplet in said oil composition; and ionisation mass spectrometry analysis of said oil composition.

Such a method may allow direct injection of the oil composition including the microdroplets into a mass spectrometer (MS). Thus, low or substantially zero dilution of the analyte, for example by a carrier as may be found in an indirect injection method, may be achieved. The method may thus achieve high analyte detection sensitivity.

In embodiments, the mass spectrometry may be combined with other techniques such as fluorescence-based analyte detection and/or high performance liquid chromatography (HPLC). Such techniques may be performed before the mass spectrometry for analyte selection prior to emission into the spectrometer.

The stabilisation may reduce deformation of the microdroplet, for example such that the microdroplet retains a substantially spherical shape when flowing through an irregular channel, e.g., one that is non-linear or that has varying cross-sectional area and/or profile. Additionally or alternatively, where a plurality of the aqueous microdroplets are present in the oil composition, the stabilisation preferably reduces or substantially suppresses fusion of such microdroplets with one another. Such fusion may otherwise occur for example during passage of droplets through a flow path such as tubing, for example due to restrictions, e.g., a narrowing, in a flow path of the oil composition, and/or neighbouring microdroplets may gradually fuse over time. The stabilisation may be advantageous to retain an ordered flow of a series of microdroplets in the oil composition, for example so that the path and/or time of travel of each successive microdroplet along a flow path comprising a restriction (e.g., a decrease followed by an increase in the flow path cross-sectional area) is substantially the same for each microdroplet in a sequence of microdroplets. Maintenance of order and/or consistency of timing is advantageous for example to time-based chemical reaction analysis.

The ionisation mass spectrometry may comprise electrospray ionisation, specifically, Microdroplet Electrospray Ionisation Mass Spectrometry (ESI MS). The oil composition may be sprayed from an emitter such as an aperture of a capillary. Such an emitter may allow formation of a Taylor cone from which molecules may be emitted into the spectrometer. Thus, charged or neutral organic molecules and/or inorganic salts present in the aqueous microdroplets may be emitted by ionisation and acceleration in the electric field of the mass spectrometer, and/or by evaporation (for example where the oil composition in the emitter is heated).

The aqueous microdroplet may be, e.g., a ~2 nL-200 pL plug, may have a diameter in the range of several (e.g., ~5 um-~10 um) to tens (e.g., ~20 um, ~50 um, greater than ~100 um) of microns, and/or may comprise one or more analytes, e.g., a single analyte or a mixture of analytes. The analyte may be fluorescent or non-fluorescent, and may comprise, e.g., chemical compounds such as for an enzymatic assay (e.g., an embodiment may assay compounds for their efficacy as enzyme inhibitors.), DNA, protein, peptide, an organism such as a cell, etc.

The oil composition may comprise, e.g., fluorous and/or mineral oil, and, e.g., 25% vov/vol, surfactant. A relatively low viscosity and/or light oil is preferable, for example since such oils generally have lower boiling points, which may be advantageous for evaporation from an ESI MS emitter. More specifically, the above ESI-MS thus advantageously uses a sprayable oil, preferably of low viscosity, low boiling point, i.e. suitable for evaporation from the emitter, e.g., bp ~100-~120 deg C. similar to water, and/or that allows formation of a stable Taylor cone on the mass spectrometry emitter.

The 'surfactant' as referred to in the above definition of the first aspect may relate to one or more surfactants, and may be polymeric or small molecule surfactant. Moreover, the surfactant preferably ionises relatively inefficiently (for example compared to the analyte). Such surfactant may have relatively poor surfactant properties, e.g., may be less good at preventing fusion of microdroplets, compared to other surfactant that is less suitable for mass spectrometry. For example, surfactant in an embodiment may comprise small molecules (e.g., having a molecular weight of less than 800 g/mol, more preferably less than 600 g/mol or 400 g/mol, e.g., 364 g/mol) and hence may be volatile. This may be advantageous for evaporation of the spray droplets allowing more charged analyte molecules to be in the gas phase for detection by the mass spectrometer.

In contrast to the above relatively poor surfactant, surfactants derived from block co-polymers of perfluoroethers, e.g. Krytox™ and polyethyleneglycol (PEG) containing one or more amide linkages and with both variable geometry and morphology might appear suitable. However, surfactants composed of fluorophilic and hydrophilic co-block polymers of the above type, which are linked together via amide bonds, do not in practice prove useful for droplet mass spectrometry, due to significant suppression of the analyte(s) ions by those from the competing surfactant. These biocompatible di-block and triblock amide based copolymers generally have more flexible chains that allow better packing at the interface. Also being polymeric they generally pack a considerable depth of fluorous tail onto the interface of the droplet. This structure of a polar polymeric hydrophilic core with two polymeric fluorous tails on either end helps to stabilise the surface of the droplet hence stop them merging (a bit like bumpers on a car—they have some spring).

In contrast, fluoroalkyl chains as in 1H,1H,2H,2H-perfluorooctanol are more preferable in an embodiment as they are relatively rigid (but may be of too short a length to stop droplets coming into contact and coalescing). Such a molecule only has six carbons with fluorines attached, carbons 1 and 2 having hydrogens attached. This molecule also only has one hydroxyl group (i.e. a small polar head group) with a short rigid fluorous tail.

The surfactant preferably has a low boiling point, e.g., ~100-~120 deg C. similar to water, and is thus preferably a relatively light molecule. As indicated above, this may be advantageous for evaporation from the droplets that are sprayed from the emitter. However, the boiling point of the oil and surfactant may not in all cases be linked to the success of ionisation, or to the sensitivity of the mass spectrometry. While oil and surfactant with low boiling point have been used in experiments, other combinations of oil and surfactant that do not interfere with the ionisation and detection of analyte may also be suitable. Thus, ideally a surfactant would be biocompatible, stabilise droplets against coalescence during droplet storage (from several hours to many days) and allow analysis by droplet reinjection, for example into a derivative of a T-junction device for analysis by mass spectrometry. However, the covalent linkages of such a bio-compatible polymeric surfactant should not contain amide bonds that ionise well and which can out compete the analyte ion signal.

More specifically, a suitable surfactant may be a molecule having a hydrophilic or polarised head end (e.g. alcohol, ether, ester, acid or amine based or some polymeric combination of these functional groups), and a fluorophilic (e.g. fluorocarbon) tail end. Good surfactants may be amide-based and/or polymeric, e.g., polyamide, but it has been found that in practice these also ionise well using the electrospray mass spectroscopy technique and so are overall less preferable. Counter-intuitively those surfactants which are relatively poor appear also to be those which are preferable for use in embodiments of the techniques we describe (although there does not appear to be an inherent reason why this is the case). In some preferred implementations the tail may comprise a fluorinated chain (for example the surfactant may be a fluorocarbon) so that the tail end is fluorophilic; this is helpful for use with fluorous oils (e.g. perfluoroalkylamine oil). Various surfactants have allowed high analyte detection sensitivity in experiments, e.g., 1H,1H,2H,2H-perfluoro-1-octanol and pentadecafluorooctanoic acid. Because the preferred surfactants are relatively poor a relatively high concentration of surfactant may be needed, for example greater than 5%, 10%, 15%, 20%, 25% or 30% vol/vol or <5 mg/ml dependent on its structural type.

Preferably, the surfactant is less ionisable than the analyte. Similarly, the oil is preferably less ionisable than the analyte. The sign and magnitude of the ionisation potential difference is preferably such that ions produced from the oil and/or surfactant have opposite charge from the ionised analyte, or are neutral.

More specifically, the surfactant preferably has a higher ionisation potential relative to the analyte or analytes, e.g. such that the surfactant remains neutral and is not observed in the mass spectrometer, or is an acid or base which dissociates in solution to produce an ion which is oppositely charged to the sign of the potential difference applied to the emitter used to ionise the analyte. A greater proportion of available charge may then be available to allow ionisation of the analyte rather than the oil or surfactant during mass spectrometry.

In view of the poor surfactant used in embodiments, it may be advantageous to space the droplets or plugs in the channel out separated evenly by oil, preferably to ensure that they pass through the channel into the emitter such that contact between them is reduced or substantially never occurs. This may be achieved by zero dead volume fitting to guide the droplets in to the lumen of the emitter.

There may further be provided the above method, comprising distinguishing said microdroplet from another said microdroplet. Such a method may comprise acquiring a plurality of electrospray ionisation mass spectrometry spectra to distinguish said microdroplet from another said microdroplet. For example, 3 or 4 scans may be taken so that the beginning and end of a microdroplet can be identified from scans taken at different instants of time.

According to a second aspect of the present invention, there is provided microdroplet ionisation mass spectrometry apparatus for detecting analyte, the apparatus comprising: an ion source comprising an electrode configured to ionise an oil composition, said oil composition comprising oil and an aqueous microdroplet comprising said analyte, said oil composition comprising surfactant to stabilise said aqueous microdroplet in said oil composition; an ion mass spectrometer to analyse said ionised oil composition to detect said analyte.

The oil, microdroplet, analyte, surfactant, etc. may be as described for the above aspects, e.g., the aqueous microdroplet may comprise one or more analytes, e.g., a single analyte or a mixture of analytes.

The ionisation may comprise electrospray ionisation, specifically, ESI-MS. The spray may be emitted in a direction that is non-parallel, e.g., at about 90 degrees to, the direction of the final path of analyte ions into the MS detector. The paths of neutral molecules and/or ions of opposite charge to the ionised analytes may thus deviate to a greater extent in the mass spectrometer or may not enter the spectrometer at all.

This may more effectively isolate the analyte ions and thus improve the detection signal-to-noise ratio.

There may further be provided the above apparatus, wherein the oil composition comprises a plurality of the aqueous microdroplets, the apparatus comprising a guide to guide flow of said an oil composition to said ion source such that said microdroplets flow into and out of said guide on a substantially first-in-first-out basis, e.g., through a capillary to an emitter aperture thereof. This contrasts for example to a first-in-last-out arrangement, e.g., that involves sucking a composition into a reservoir and then propelling the composition back out of the reservoir in the opposite direction. Such a first-in-first-out embodiment may be advantageous by allowing a direct path for the microdroplets to the emitter, e.g., from a microdroplet generator, for example without requiring any mechanical intervention to retain an order of droplets. Moreover, such a first-in-first-out embodiment may be advantageous where desirable to generate the microdroplets on-chip, the chip preferably further having a mass spectrometry emitter that is preferably directly connected by a first-in-first-out arrangement to the microdroplet generator.

Further advantageously, such a first-in-first-out embodiment may ensure that all microdroplets have substantially the same history, e.g., the time and/or distance covered by each microdroplet between generation and emission or between mixing of oil and microdroplets and spraying is substantially the same and/or predetermined for all microdroplets. Thus, a known analyte incubation period may be achieved.

Furthermore, direct integration into the emitter may allow for the use of much shorter times between formation of a droplet and analysis (compared for example to a method where the droplets are formed by sucking up a composition into a capillary, then later emptying the capillary). This is of interest in relation to chemical reaction analysis as it may allow the measurement of fast reactions. For example, the conditions of an enzymatic assay may be manipulated such that the assay occurred on a very short time scale, measurable only by microdroplet-based rapid-mixing. Performing such an assay with a very short reaction time may allow many more reactions to be screened in a given amount of time.

There may further be provided the above apparatus, wherein said guide comprises a capillary, which may comprise the emitter and/or may be on-chip, e.g., attached to a microdroplet generating chip. The apparatus may then comprise: a pressuriser to drive said oil composition through said capillary to an output of said capillary; said electrode to form a Taylor cone comprising said oil composition by field evaporation from said Taylor cone.

The capillary may have a metal coating at the output to increase the ionisation. Such a coating may enhance transfer of charge to the microdroplets and/or be held at different potential, e.g. 1.5-3 kV, relative to another electrode, e.g., ground electrode, of the MS, to assist the ionisation. The metal coating may be applied by surface roughening a capillary inner surface with silicon carbide paper, and depositing chromium and then the metal, e.g., Au, on the roughened surface. The surface roughening process not only may reduce the contact angle of the oil composition on the capillary surface but may also result in a tapered profile; each of these effects may reduce the size of droplets sprayed from the emitter. The capillary is advantageously flat-ended, e.g., not tapered. The capillary may be flat-ended or tapered.

According to a third aspect of the present invention, there is provided a microdroplet chip comprising an emitter for ionisation mass spectrometry detection of analyte, said microdroplet chip comprising: a guide to feed an oil composition to said emitter, said oil composition comprising oil and an aqueous microdroplet comprising said analyte, said oil composition comprising surfactant to stabilise said aqueous microdroplet in said oil composition; and said emitter for ionisation of said oil composition and dispersion of said ionised oil composition.

Such a chip for microfluidics may have channel(s) with maximum dimension typically <1 mm, 500 or 300 micrometres, and/or be configured for laminar flow; typically flow has a Reynolds number of <30, <10, <2, or <1. The chip may be configured to enable generation of the microdroplets and/or oil composition, and/or may comprise the emitter, e.g., a capillary as defined above.

The oil, microdroplet, analyte, surfactant, etc. may be as described for the above aspects, e.g., the aqueous microdroplet may comprise one or more analytes, e.g., a single analyte or a mixture of analytes.

There may further be provided the above microdroplet chip, wherein said ionisation and said dispersion comprises electrospray ionisation.

There may further be provided the above microdroplet chip, comprising a generator to generate said aqueous microdroplet.

There may further be provided the above aqueous microdroplet, wherein said guide is configured to feed said oil composition on a substantially first-in-first-out flow to said emitter. This may allow an ordered succession of single microdroplets through the same tubing, e.g., microchannels, capillary, to the emitter and/or a low risk of contamination.

There may further be provided the above microdroplet chip, wherein said guide comprises a capillary to guide said oil composition to said emitter and said emitter comprises an open end of said capillary.

There may further be provided the above microdroplet chip, wherein said microdroplet chip comprises PDMS. Additionally or alternatively, the chip may comprise silicon, e.g., may be a silicon chip.

There may further be provided the above microdroplet chip wherein said microdroplet chip comprises a fused silica capillary emitter.

According to a fourth aspect of the present invention, there is provided an aqueous microdroplet containing analyte, said aqueous microdroplet for ionisation mass spectrometry detection of said analyte, wherein said aqueous microdroplet has surfactant on a surface of said microdroplet, said surfactant to stabilise said microdroplet in an oil composition.

The analyte, surfactant, etc. may be as described for the above aspects, e.g., the aqueous microdroplet may comprise one or more analytes, e.g., a single analyte or a mixture of analytes.

There may further be provided the above aqueous microdroplet, wherein said surfactant comprises a small molecule composition or a polymer composition. Preferably, the microdroplet is for electrospray ionisation of the analyte.

A further advantageous embodiment is oil comprising the above aqueous microdroplet of the fourth aspect. Such oil may be fluorous.

According to a fifth aspect of the present invention, there is provided a method of performing ionisation mass spectrometry of the contents of a microdroplet water-in-oil emulsion, the method comprising: providing the microdroplet with a surfactant layer to stabilise said microdroplet; and providing the microdroplet with said surfactant layer to ionisation mass spectrometry apparatus for analysis of said contents.

Such a method may further comprise generating a spray from a stream of said microdroplets for injection into the ionisation mass spectrometry apparatus.

According to a sixth aspect of the present invention, there is provided an apparatus for performing ionisation mass spectrometry of the contents of a microdroplet water-in-oil emulsion, comprising: a microfluidic device configured to provide a stream of microdroplets for injection into said ionisation mass spectrometry apparatus; an emitter coupled to a microfluidic channel of said microfluidic device to generate a spray from said stream of microdroplets; and ionisation mass spectrometry apparatus configured to receive and analyse said spray of microdroplets.

Preferred embodiments are defined in the appended dependent claims.

Droplet Re-Injection

Further development of the above described techniques has enabled the inventors to perform droplet re-injection into a microfluidic chip for subsequent mass spectrometry (MS) analysis.

The ability to perform droplet re-injection experiments is advantageous because although with a delay line a droplet may take of order 5 minutes to progress through a microfluidic channel to the electrospray orifice, there are many applications where this is not sufficiently long to observe the desired reaction—which may be, for example, an enzyme or antibody reaction, digital PCR (a droplet-based polymerase chain reaction where, on average, there is not more than one template DNA molecule per droplet) or the like. Thus it is advantageous to be able to capture one or more reagents in a droplet, then to store/incubate or otherwise process these, either on-chip or off-chip, and then afterwards to electrospray these from the emitter of the microfluidic device into the mass spectrometry apparatus for analysis (more precisely, to electrospray droplets comprising material derived from a droplet of the emulsion, in particular an aqueous solution of the analyte, into the mass spectrometry apparatus).

Broadly speaking, re-injection involves forming droplets, storing or processing them in some way, for example storing them for a period to incubate a chemical reaction, and then re-injecting the droplets into a portion of a microfluidic device for assay. Despite the use in the art of the term "re-injection", this process need not necessarily involve the droplets being removed from a microfluidic device as all the processing may take place in different regions of a single device; nor does it require that droplets are returned to the device where they were formed—they may be re-injected into a second device. For example droplets may be formed in one part of a device by a flow focusing method (for example where one, or preferably two oil channels enter a central aqueous flow from either side, to create a water-in-oil emulsion), and then stored/processed in another part of the same device or off-chip after extraction, and then "re-injected" into either a different part of the same device or another device for further manipulation/analysis.

Thus in embodiments the microdroplets in their oil are mixed with further oil or an oil solution, preferably in a microfluidic device. This performs the twin functions of at least partially displacing (removing) the surfactant from the outside of the droplets, and at the same time spacing the droplets apart, which is advantageous for controlling the rate of injection of the droplets into the mass spectrometry apparatus. Typically the re-injected droplets are closely spaced and adding oil or an oil solution helps to separate the droplets, and the increased spacing between the droplets provides a synergistic effect in that because the droplets are spaced apart the risk of droplets fusing is controlled (this might otherwise be enhanced because of the reduction in surfactant).

Diluting the droplets in this way also facilitates the mass spectrometry analysis as because the droplets are spaced out it is easier to arrange for the mass spectrometry apparatus to capture a spectrum of the contents of just one droplet at a time. Typically a mass spectrometry instrument captures spectra at repeated intervals (at for example of order 10 Hz for a 0.05 second scan followed by a 0.05 second delay), and thus by controlling the droplet injection rate a mass spectrum may be captured separately from each droplet (although depending upon the timing there may be more than one, for example two or three, spectra captured for each droplet). This is important in extracting the desired signal from the background noise, especially when the background noise may contain a masking signal from the surfactant and/or from the analyte itself (for example from the salt form of a protein). This is because when multiple single droplets can be resolved multiple spectra of individual droplets may be averaged to extract the desired signal from the noise. This may be facilitated by controlling one or both of the output flow rates of the microdroplets and the spectrum capture rate of the mass spectrometry apparatus.

The diluting oil may be the same oil as originally used to store/transport the microdroplets, in preferred embodiments a fluorous oil. Alternatively the emulsion of microdroplets in their oil may be mixed with a solution comprising a second surfactant different to that originally used, for example a fluorous oil solution of the second surfactant. In this latter case the second surfactant may partially displace the original surfactant.

Suitable fluorous oils include perfluoroalkane, amine or ether (either cyclic or linear), for example perfluorooctane; the oil need not be completely fluorinated and/or may be a fluorocarbon derivative. Preferably the oil has a relatively low absolute viscosity, for example less than 10, 5, 3 or 2 centipoise (cP). Other example fluorous oils which may be advantageously employed include FC77, FC3283, HFE-7 100, and HFE-7 300 (all 3M trade names).

Dilution of surface surfactant on a droplet takes place whether or not a second surfactant is employed. Where a second surfactant is employed preferably this is less ionisable than the original surfactant, so as to be less visible in the mass spectrometry apparatus. Surprisingly it has been found that a polymeric surfactant can be employed even when producing droplets at high rates, for example more than 100K per second, and even when the droplets are very small (for example, less than 10 μm diameter). This is advantageous because the droplet processing and/or re-injection can result in considerable deformation of a droplet, and thus a good surfactant is helpful in maintaining droplet integrity. An example polymeric surfactant is a tri-block co-polymer for example comprising a hydrophilic PEG region with fluorophilic regions at either end. However the synthesis of such materials can be difficult to control and this can result in non-termination functional groups which, in turn, can result in confusing ionisation and noise in the mass spectrum. It can therefore be advantageous to at least partially displace this surfactant, partially removing it from a droplet and/or partially replacing it with another surfactant. In embodiments the second surfactant is a non-polymeric (small molecule) surfactant; it may be a short chain alcohol (for example, less than C18) such as perfluorooctanol (PFOH).

In general the second surfactant is a relativity poor surfactant compared with the original surfactant. One measure of the quality of a surfactant is the interfacial tension (IFT), although by itself this is not a complete predictor of the performance of a particular surfactant. Nonetheless IFT may be employed to characterise a surfactant and thus a good surfactant may have an IFT of order 10 mN/m, and a very good surfactant may have an IFT of order 2 mN/m. By contrast a relatively poor surfactant may have an IFT of order 15 mN/m. Thus the dividing line between a good and a poor surfactant, were this to be characterised using IFT, may be 15, 14, 13, 12, 11 or 10 mN/m.

It is particularly surprising that a short chain alcohol such as perfluorooctanol (PFOH) may be employed as the second surfactant since, in other contexts, PFOH can be used to break an emulsion. Nonetheless because embodiments of the techniques separate the droplets in the output flow from the mixing process, a poor surfactant (at least a surfactant which is less good than the original surfactant, as measured by IFT) may be employed. The use of PFOH or a similar short chain alcohol is advantageous as it has been observed that there is little or no analyte suppression from such a surfactant in the mass spectrometry apparatus (whereas if this surfactant ionised well it could mask the analyte). This in turn allows relatively large quantities of the second surfactant to be employed in the oil solution, for example greater than 10% vol:vol, in one example of order 30% vol:vol in FC3283 oil.

In some preferred embodiments the original and diluting flows are mixed in a Y-junction, preferably in a microfluidic device, so that the flows merge at an acute angle, preferably an angle of less than 60 degrees to the output flow. This is because at large angles, or if a T-junction is employed, the diluting flow can split some of the droplets. In embodiments the flow rate of one or both of these flows may be controlled by a controllable pump, for example a syringe pump.

The invention also provides apparatus configured to implement the above described techniques. Preferably such apparatus comprises a microfluidic flow mixing device comprising a pair of channels forming a Y-junction, preferably each connected to a controllable pump. Such a microfluidic device preferably also incorporates an orifice or emitter, preferably with an electrically conducting coating around the outer edge for electrospraying droplets into the mass spectrometry apparatus. In embodiments the conductive coating comprises a metal such as gold. The orifice or emitter may comprise the end of a capillary; the outer diameter of this capillary may be less than 300 μm, 200 μm or 150 μm. Broadly speaking a smaller outside diameter is preferable as this results in smaller electrosprayed droplets and a more effective coulombic explosion (when the droplets 'explode' as charges within the droplets approach one another as a droplet evaporates). Optionally an end surface of the emitter/capillary may be roughened, for example using 4000 grit silicon carbide paper, to decrease the surface interface angle.

In embodiments the maximum dimension of a channel of the microfluidic device is less than 1 mm; an example channel has dimensions 50 μm by 50 μm which, for a 500 pL droplet, results in a droplet which is of order 200 μm in length. Such a droplet may travel at around 500 μm per second through a channel to the orifice which is of order 1-10 cm long. Typically a droplet has a volume of less than 100 nL, 10 nL or 1 nL.

In embodiments the analyte, for example a protein, is contained within a droplet in an 'mass spectrometry-friendly' buffer, that is a buffer based on ammonium such as ammonium bicarbonate or ammonium acetate. This is because it has been observed that ammonium ions appear to generate little or no background noise.

Features of the above described aspects and embodiments of the invention may be combined in any permutation.

Some of the techniques we describe above in particular those for partially displacing (removing) surfactant and for controlling droplet (re)injection rate are, in principle, useful with techniques other than mass spectrometry. Thus the invention also contemplates alternative techniques/apparatus to those of the above described aspects and embodiments of the invention, where the ionisation mass spectrometer is substituted by an alternative droplet-contents analysis instrument.

The invention therefore further provides a method of, and apparatus for, detecting analyte, the method comprising: (means for) providing an oil composition comprising oil and an aqueous microdroplet comprising said analyte, said oil composition comprising surfactant to stabilise said aqueous microdroplet in said oil composition; and (means for) providing said surfactant-stabilised aqueous microdroplets in said oil to an instrument to analyse the contents of said microdroplets, the method/apparatus further comprising one or both of: i) (means for) mixing said surfactant-stabilised aqueous microdroplets in said oil with an oil or solution to at least partially displace the surfactant from said microdroplets, prior to performing said analysis; and ii) (means for) controlling a rate at which said microdroplets are provided to apparatus performing said analysis by controlling a flow rate of an oil or solution mixing with said surfactant-stabilised aqueous microdroplets in said oil to control a spatial separation of said microdroplets in a flow provided to said apparatus after said mixing.

BRIEF DESCRIPTION OF THE DRAWINGS

For a better understanding of the invention and to show how the same may be carried into effect, reference will now be made, by way of example, to the accompanying drawings, in which:

FIGS. 1(*b*) and (*c*) show, respectively, the PDMS upper and lower layers of FIG. 1 in scaled-up format to show these layers more clearly. The feature shown in FIG. 1(*b*) is the capillary holder;

DETAILED DESCRIPTION OF PREFERRED EMBODIMENTS

Figure 1A:
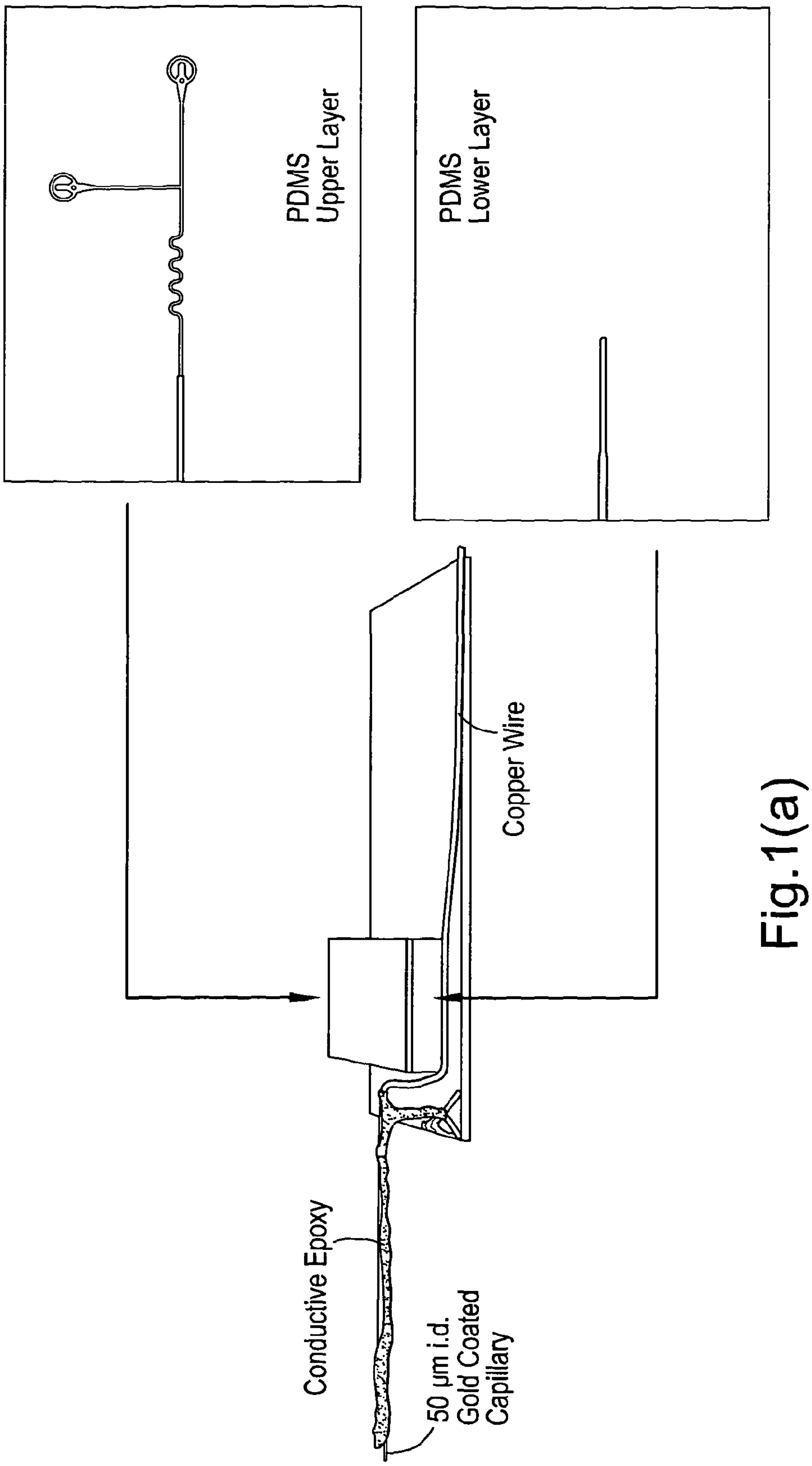
FIG. 1(*a*) shows an overview of the construction of a two-layer PDMS device for ESI-MS of intact microdroplets. This construction uses a 50 μm inner diameter (i.d.)×150 μm outer diameter (o.d.) gold-coated capillary held between PDMS layers and copper wire electrode carries voltage to capillary.

Microfluidic water-in-oil microdroplets provide discrete nanolitre and sub-nanolitre compartments that may be rapidly and reproducibly generated and/or may be able to contain a wide variety of chemical processes. Surprisingly, the use of surfactant has been found not to suppress ionisation and thus degrade analyte detection, including in relation to Microdroplet Electrospray Ionisation Mass Spectrometry (ESI MS) analyte detection. Furthermore, the presence of a suitable surfactant may allow such microdroplets to be stable. Such microdroplets may be incubated so that the products of chemical processes accumulate. To assess the progress and products of those chemical processes, it is desirable to interrogate the contents of individual microdroplets. ESI-MS may advantageously offer sensitive and/or label-independent detection of analytes from microdroplets.

Example embodiments provide a method and device for performing ESI-MS, advantageously directly, on a stream of water-in-oil microdroplets that are stabilised by surfactant. This may allow rapid interrogation of the contents of single intact microdroplets, and/or with little or no loss of sensitivity due to dilution. Thus, the following describes embodiments that may allow the detection of analytes in surfactant-stabilised water-in-oil microfluidic microdroplets by electrospray ionisation of intact aqueous microdroplets and their oil carrier phase, followed by analysis of the resulting ions by mass spectrometry. In more detail, the following considers micro-microdroplets ESI-MS, which may include, inter alia, emitter design (flat-faced, or surface modified and/or tapered), on-chip PDMS emitter designs, and oil and surfactant screening and/or optimisation.

In the example embodiments, oil-in-water microfluidic microdroplets are formed from an aqueous phase and an oil carrier phase containing a suitable surfactant. For example, microdroplets may be formed using T-junction or flow-focussing designs integrated into microfluidic devices fabricated from the elastomer polydimethylsiloxane (PDMS). However, the microdroplets could also be generated elsewhere and introduced to the device, and/or the device could be fabricated from many other polymers/glasses e.g. plastics or ceramics.

Experimental observations have shown that the choice of the oil may significantly affect sensitivity of analyte detection by ESI-MS. Volatile fluorous oils such as perfluoroethers, e.g., 3M Fluorinert FC77, perfluorotrialkylamines, e.g., 3M Fluorinert FC3283 and perfluoroalkanes, e.g., octadecafluorooctane may give the best analyte signal-to-noise in ESI-MS. There are however many other suitable oils.

In order to create stable water-in-oil microdroplets it is desirable to add a surfactant to the fluorous oil carrier phase. Surfactants that are very effective in stabilising microdroplets without suppressing analyte signals in ESI-MS have been identified by experimentation, for example, 1H,1H,2H,2H-perfluoro-1-octanol as a suitable surfactant that allows the formation of relatively stable mono-disperse microdroplets whilst giving relatively high analyte signal-to-noise in ESI-MS. Other perfluorocarbon alcohols may also perform well as surfactants for $ESI_{13}MS$. Pentadecafluorooctanoic acid has also been successfully used. However, several other perfluoroalkyl carboxylic acids have proven less suitable for the formation of stable microdroplets. There are however many other suitable surfactants.

Figure 1B:
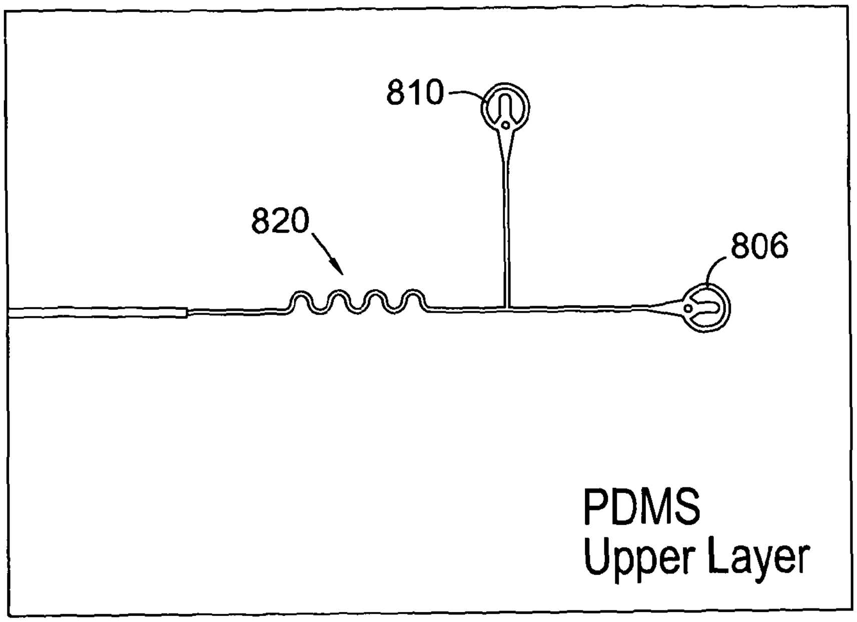
Figure 1C:
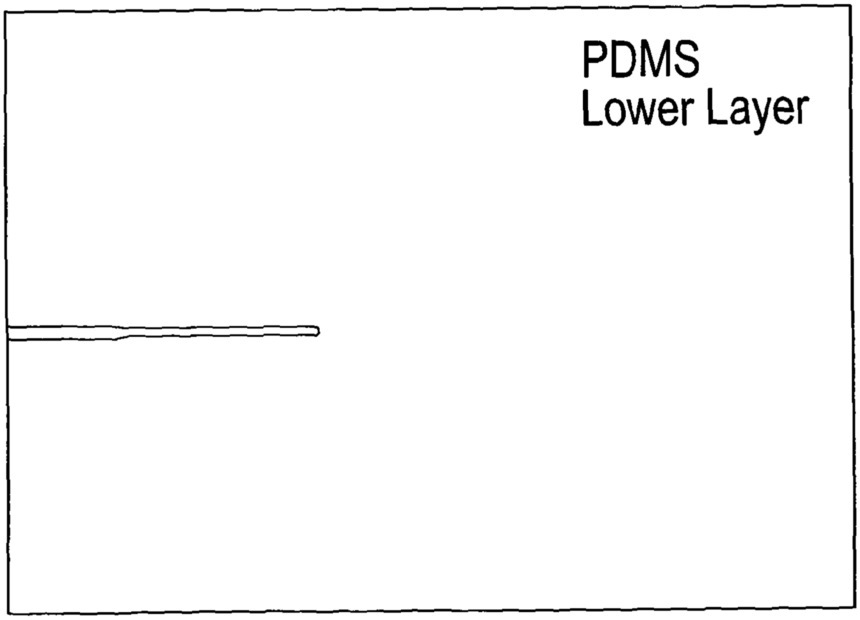
Figure 2A:
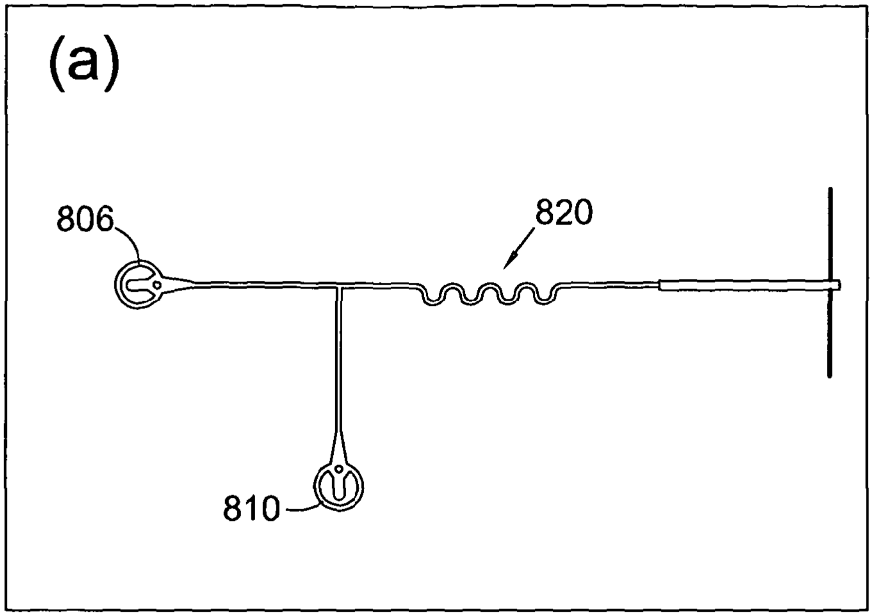
FIGS. 2(*a*)-(*f*) show designs for a two-layer ESI-MS device: (a) upper and (b) lower PDMS layers for single T-junction design with 132 μm width capillary fitting; (c) upper and (d) lower layers for double T-junction design with 132 μm width capillary fitting (FIG. 2(*c*) having a rectangle encompassing the capillary fitting and a first bend of a channel, this rectangle being provided merely for schematic purposes in relation to FIG. 2(*e*)); (e) enlargement of the region indicated by the rectangle in (c) showing that the channel tapers from 50 μm width at the mixing curves to 20 μm width at the entrance to the capillary (the border of FIG. 2(*e*) corresponds to the above rectangle of FIG. 2(*c*)). The scalloped sides of the 132 μm width capillary fitting are also shown; (*f*) micrograph showing a 150 μm external diameter, 50 μm internal diameter fused-silica capillary mounted in the capillary fitting. Microdroplets can be seen in the channel and in the capillary lumen.
Figure 2B:
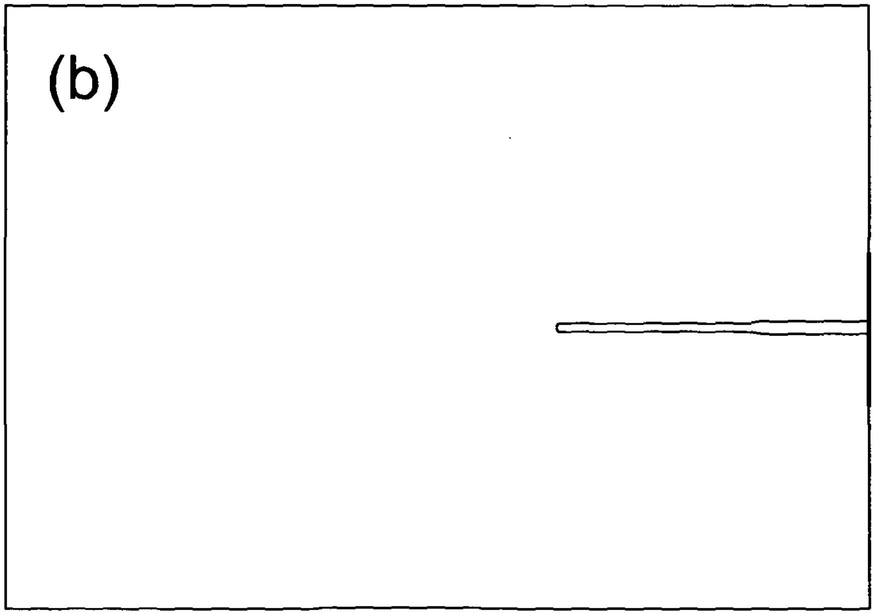
Figure 2C:
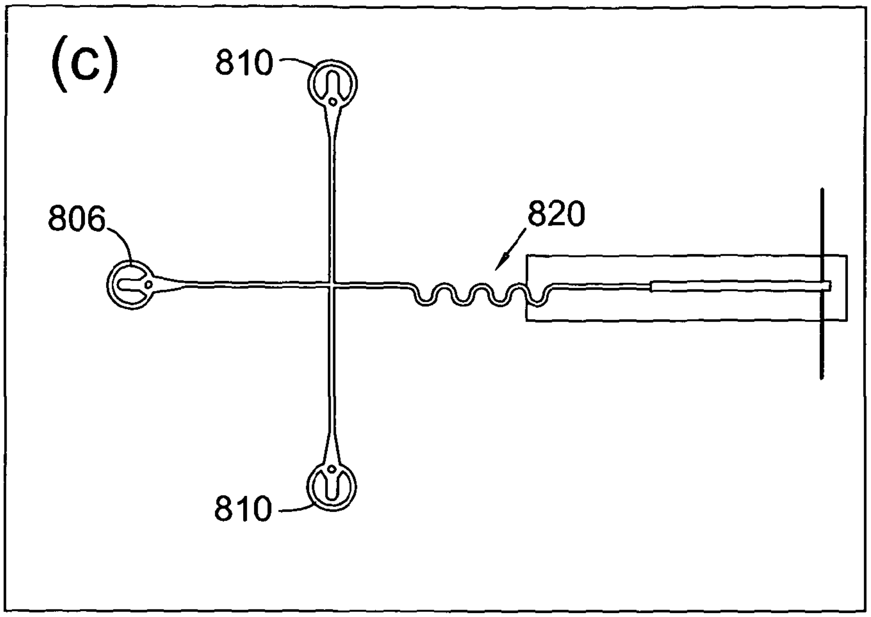
Figure 2D:
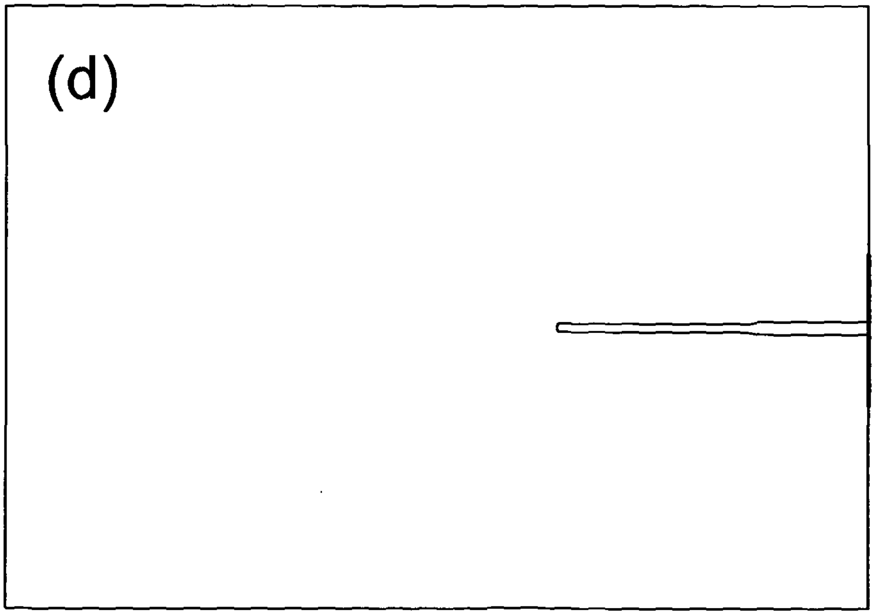
Figure 2E:
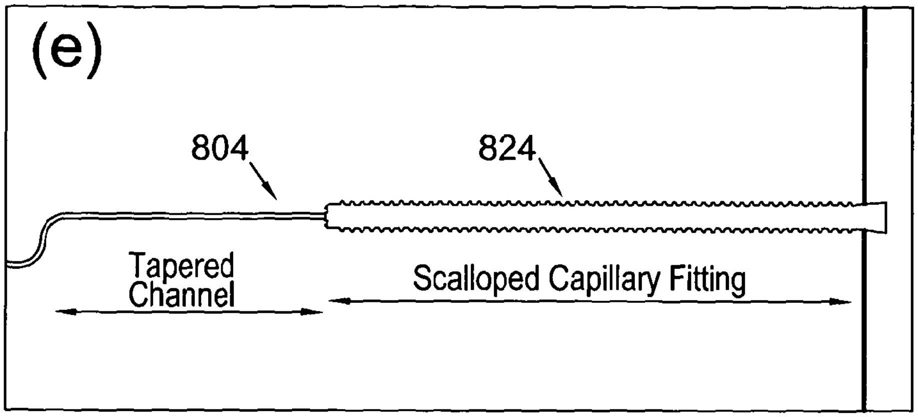
Figure 2F:
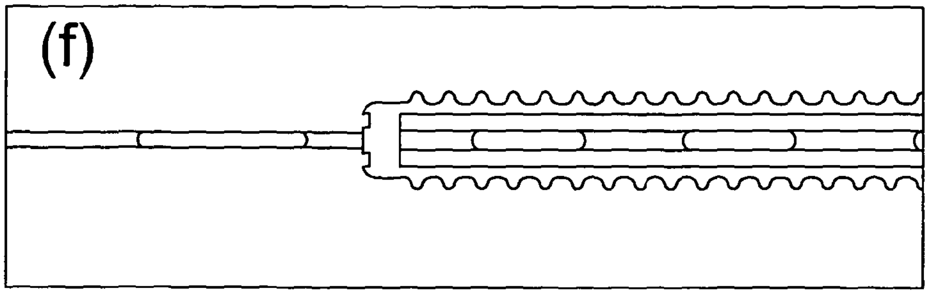
Figure 3A:
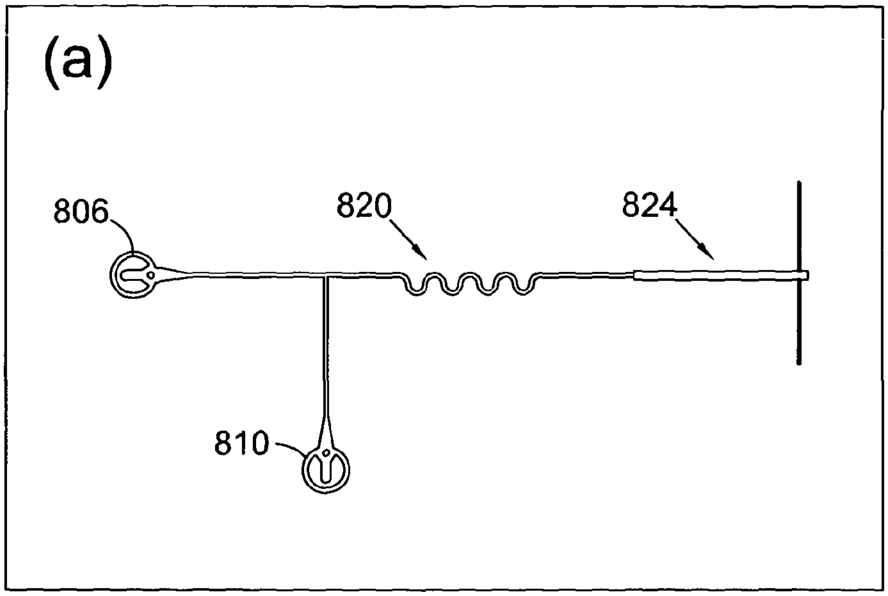
FIGS. 3(*a*)-(*f*) show alternative designs: (a) upper and (b) lower PDMS layers for modified single T-junction design with 122-126 μm width capillary fitting; (c) and (d) modified single T-junction design with additional inlets to enable the fixing of the capillary within the channel using epoxy adhesive; (e) and (f) modified single T-junction design with an additional inlet to enable the filling of the capillary fitting with uncured PDMS or a suitable adhesive by syringe.
Figure 3B:
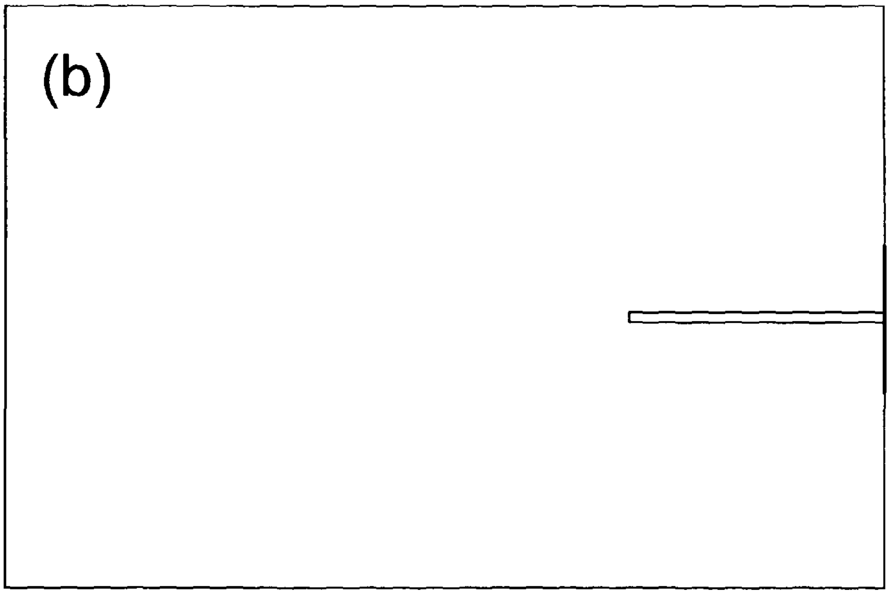
Figure 3C:
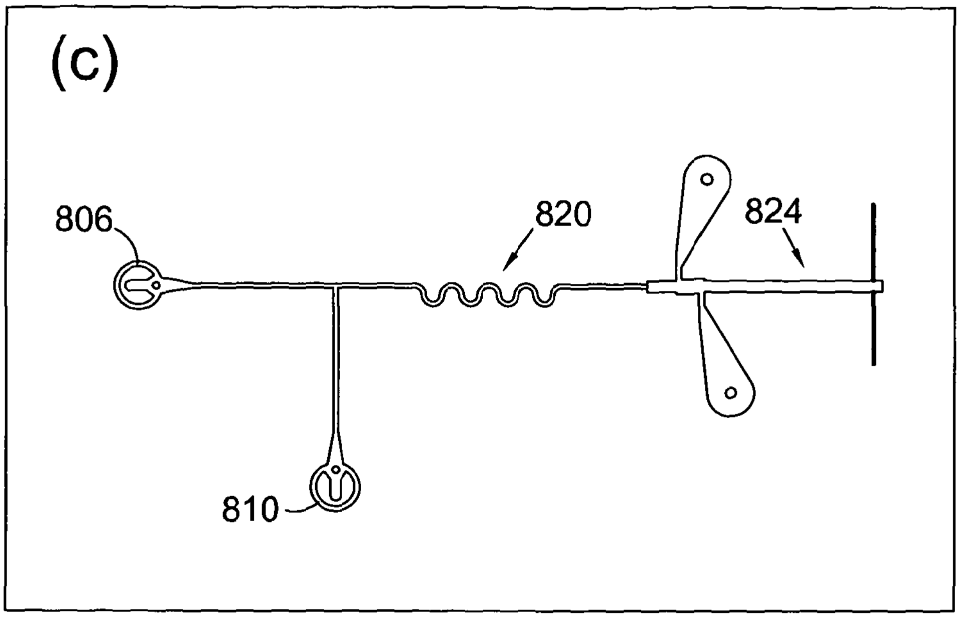
Figure 3D:
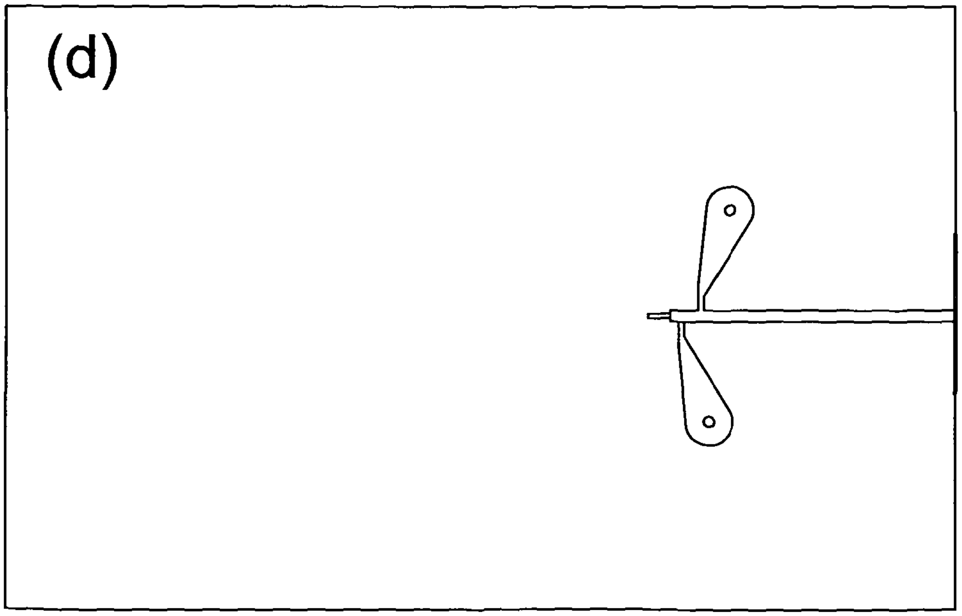
Figure 3E:
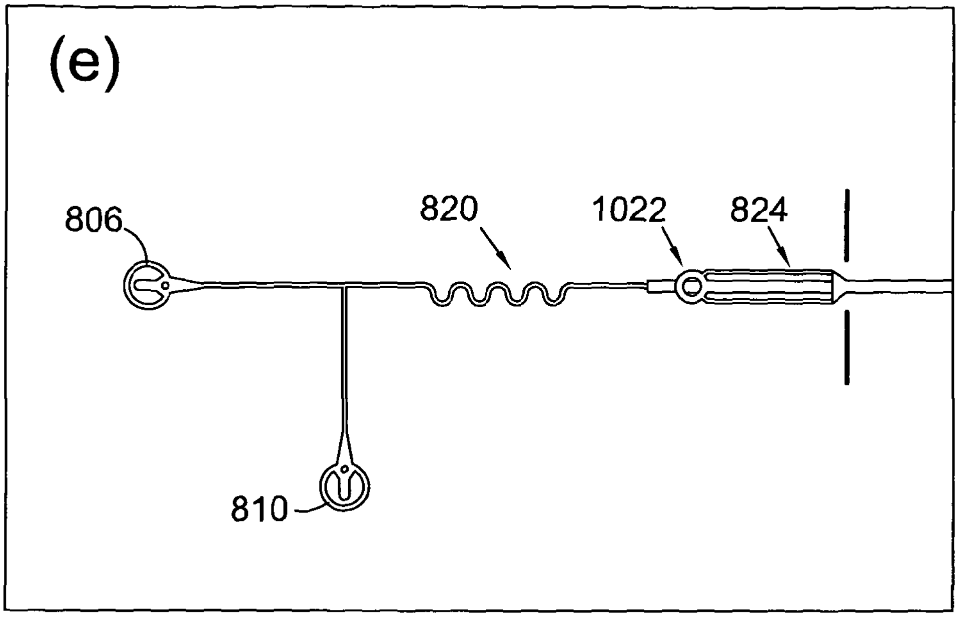
Figure 3F:
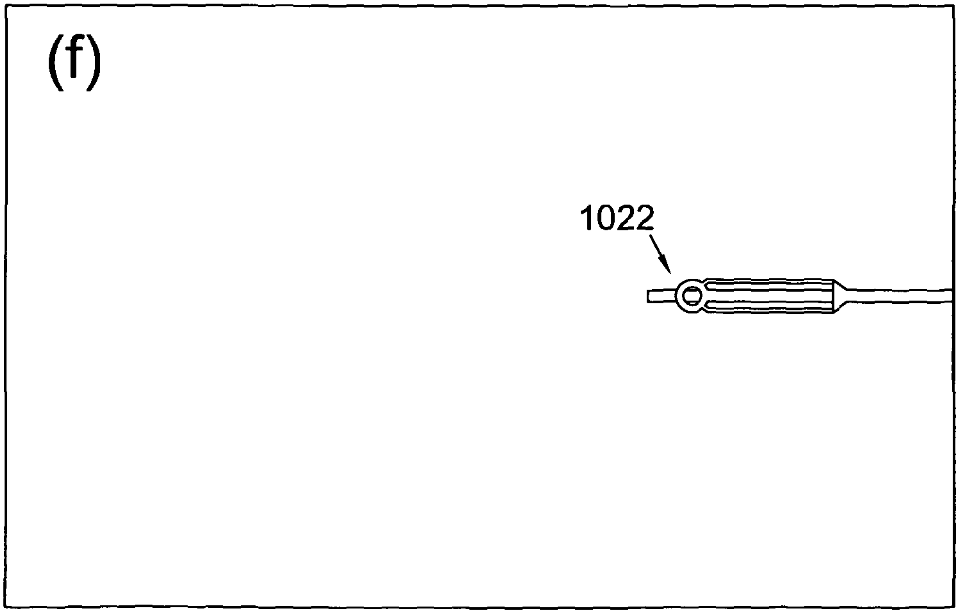
Figure 9:
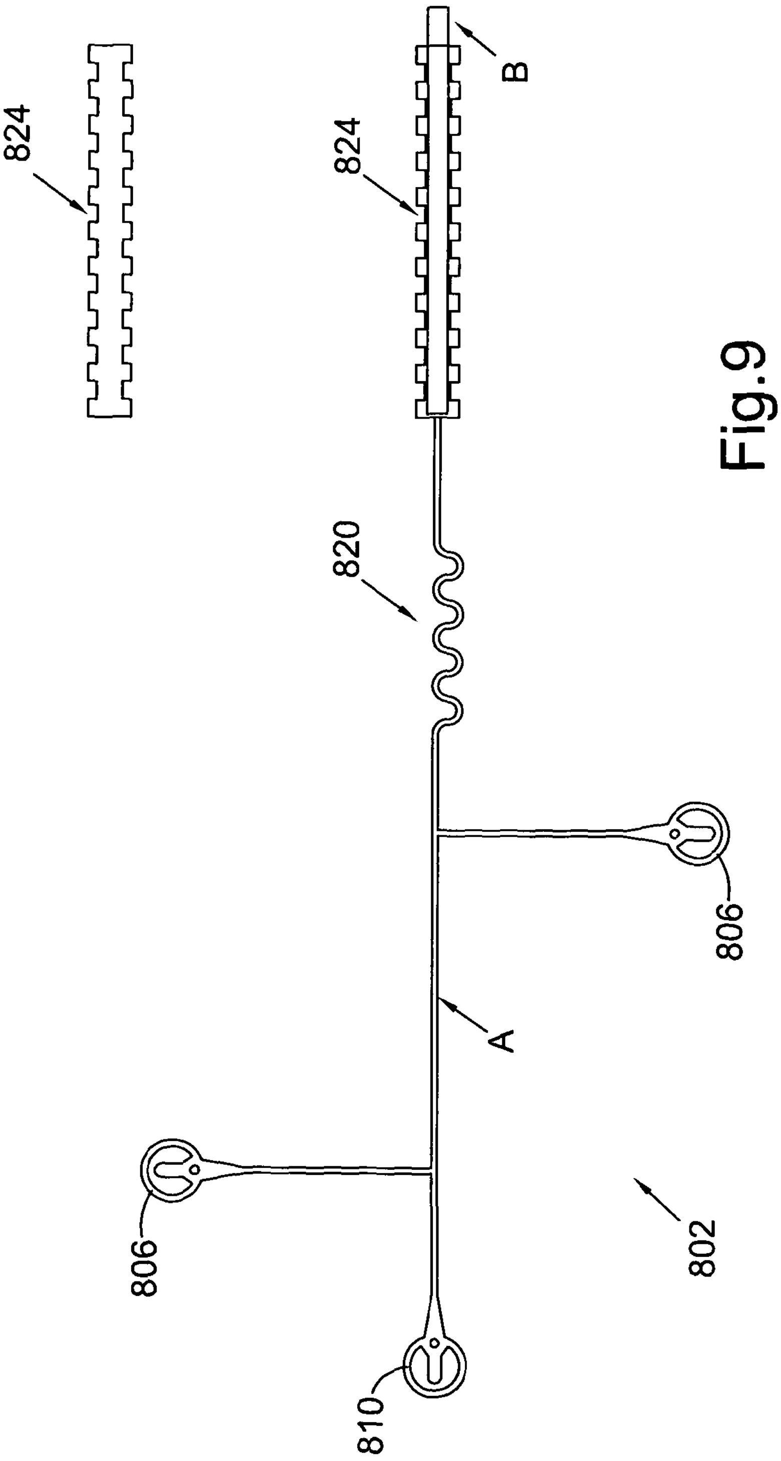
FIG. 9 shows a 75 um process, 50 um channel, 360 um×50 um (o.d.×i.d.) capillary, the upper part of FIG. 9 showing a bottom half of the capillary holder, the lower part of FIG. 9 showing at A a 75 um top half part of the holder and at B a 360 um o.d. capillary with 50 um i.d., the overall design including capillary holder, channels and punch holes for tubing insertion.

The embodiments may involve a laminated two-layer PDMS device that contains one or more T-junctions for microdroplet formation, a serpentine mixer to ensure homogeneity of microdroplet contents and/or an integrated capillary emitter for ESI-MS (FIGS. 1 and 2; described further later). The channel height on both PDMS layers may be, e.g., 50 μm, but generally this can be varied to accommodate different microdroplets sizes and different capillary outer-diameters. (A suitable capillary is shown in FIG. 9; described further later).

The capillary emitter of the above device is formed from a length of fused-silica capillary, preferably less than 500 μm outer-diameter and less than 100 μm inner-diameter, that is either plastic (e.g., polyimide) coated, or partially uncoated. The ends of the capillary are preferably clean cut orthogonal to the long-axis of the capillary. This may be achieved by cutting the capillary with either a ceramic or silicon carbide blade and then polishing the capillary on a rotary polishing disc to a achieve a very flat but also a surface roughened surface. The capillary is further coated in one or more conductive metals, e.g., by evaporative deposition of gold atoms. However, the emitter may be provided using a photonic fibre rather than fused-silica capillary. Moreover, the emitter may be a multiple parallel channel emitter for example by using a photonic bundle rather than fused-silica capillary.

The capillary emitter sits in a channel formed by features from each of the two laminated PDMS layers. It is held in place by a scalloped compression fitting (FIG. 2 (*e*),(*f*)) that has dimensions smaller than the capillary outer-diameter. A tight fit may be achieved without damaging the device or capillary by the use of a lubricating solvent, aided by the innate flexibility of the PDMS elastomer.

The end of the capillary that sits within the device abuts the exit of a channel that tapers to a width either equal to or less than the internal-diameter of the capillary. This advantageously forms a fluid-tight seal of essentially zero dead-volume and facilitate the transfer of intact microdroplets from the channel into the capillary lumen.

The capillary is secured into the device by the external application of an adhesive or uncured PDMS. However, the capillary may additionally or alternatively be secured by the introduction of adhesive or uncured PDMS into the capillary fitting itself (see designs in FIG. 3), and/or through activation of the fused-silica capillary by oxygen plasma so that it adheres to the PDMS walls of the device. Such approaches may increase the resistance of the capillary fitting to leakage.

To achieve electrospray ionisation, a potential difference is created between the emitter and the mass spectrometer. For example, either the emitter is charged and the spectrometer is held at ground, or vice versa. Such charge may be positive or negative to select for negative or positive ions respectively. Generally, the charge is applied to the emitter, or to an aqueous phase that flows through into emitter. A thick conductive metal wire may be used to supply an electrical charge to the conductive metal coating on the emitter capillary. The wire is attached to the emitter using conductive epoxy adhesive. The wire further serves to support the capillary emitter, providing additional rigidity and/or preventing the capillary from rapidly twitching in the electrical field near to the inlet to the mass spectrometer (the source cone). As shown in experiments, this may result in more consistent and/or stable electrospray over time.

The device preferably operates in the nanospray regime of electrospray ionisation where extremely small spray-microdroplets are generated at the emitter tip, for example to increase and preferably maximise sensitivity. This may involve a total flow rate of aqueous and carrier phases of less than, e.g., 1000 nl/min (1 μl/min or 60 μL/hr).

Experiments have most successfully been performed at atmospheric pressure, with the electrospray ion source temperature set to between 20° C. and 100° C. However, the sensitivity of measurements may be improved by operating the device at other temperatures and at higher or lower pressure.

Several ESI spectra per microdroplet may be acquired, preferably where each spectrum has a high-enough signal to noise ratio to allow unambiguous identification of the analyte(s) in the microdroplet. The plurality of spectra may improve reliability of detection of contents of a single microdroplet and/or enable/improve distinguishing of one microdroplet from the next. Preferably, a microdroplet ESI-MS embodiment operates at or near maximum scan rate of MS (ca. 8.8 Hz), preferably at less than 4.5 Hz, preferably to provide a pattern "see signal, no signal, see signal . . . ", and so forth, representing the signal seen by the MS apparatus as each successive droplet is analysed in turn. Thus preferably the acquiring of a plurality of spectra allow peaks and troughs in the analyte signal—resulting, respectively, from the presence or absence of a droplet containing analyte—to be resolved unambiguously. Single-microdroplet resolved detection may however depend upon a careful choice of analyte concentration, flow-rate of aqueous and/or oil phases, the oil used, the surfactant, the surfactant concentration, the device geometry, ESI-MS scan-rate and/or capillary inner-diameter.

Single-microdroplet resolved detection under the specific conditions described in the following paragraph has been achieved. Other combinations of these parameters may give a lower limit of detection and/or higher microdroplet-throughput.

Figure 4A:
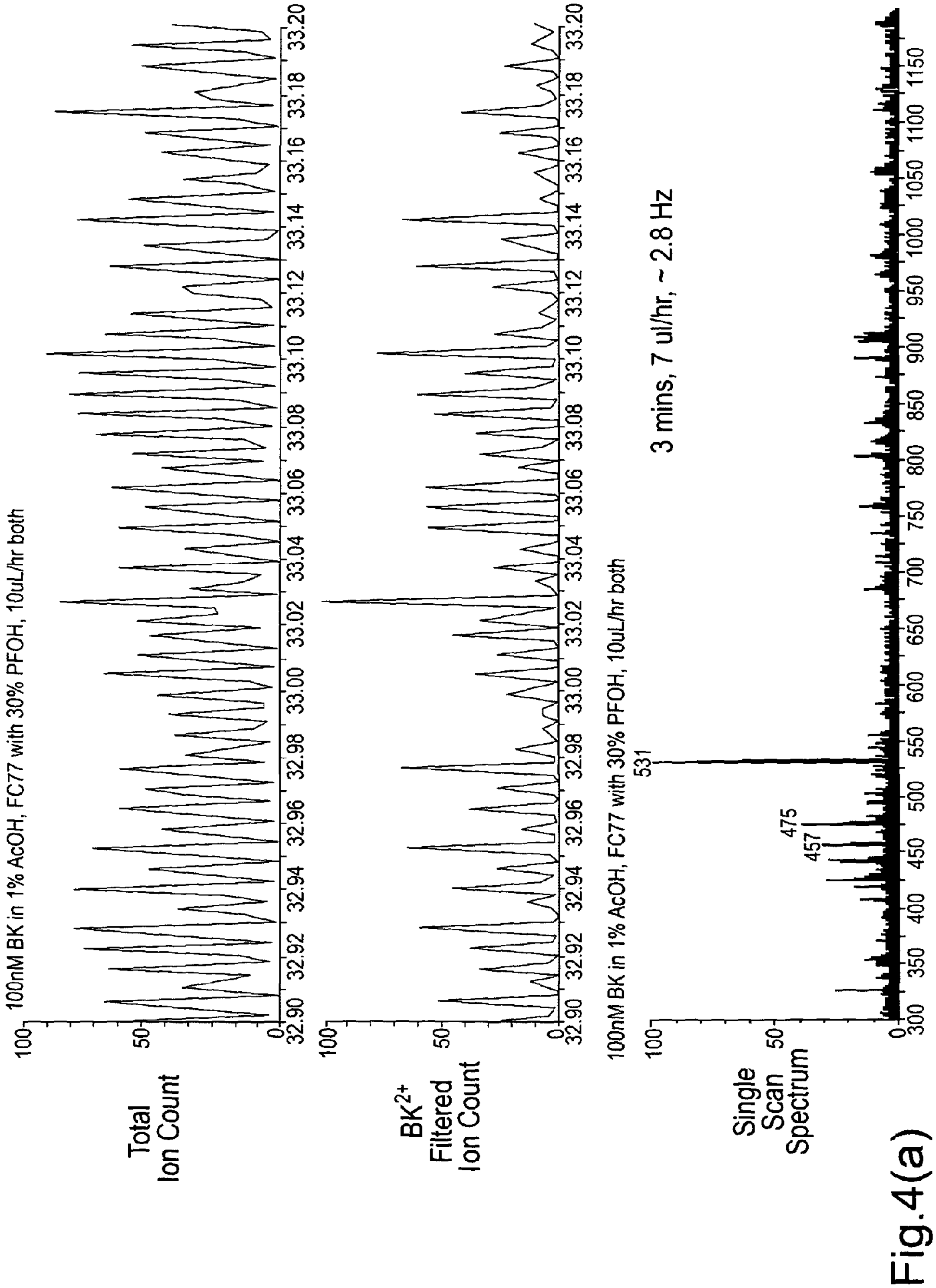
FIGS. 4(*a*) and (*b*) show mass spectrometry data acquired over the course of an hour of continuous electrospray ionisation of aqueous microdroplets of 100 nM bradykinin peptide with 0.1% acetic acid. The carrier phase was 3M Fluorinert FC77 with 30% v/v1H,1H,2H,2H perfluoro-1-octanol as a surfactant. 20 seconds of data acquired at flow rates of aqueous and carrier phases of (a) 7 and (b) 6 μL/hr are shown. In each case, the total ion count shows the normalised intensity of the ion current for all ions entering the spectrometer over time. The ion count filtered for the doubly-charged bradykinin ion ($BK^{2+}$, m/z 530-532) shows the normalised intensity of the ion current in that narrow m/z range over time. A representative single-scan spectrum from a peak in the ion count filtered for the doubly-charged bradykinin ion is also shown in each case. More specifically, details, for each of FIGS. 4(*a*) and (*b*), are 100 nM BK in 1% AcOH, FC77 with 30% PFOH, 10 uL/hr both. The horizontal axes on the total ion count and $BK^{2+}$ filtered ion count graphs of FIG. 4(*a*) are labelled linearly from 32.90 to 33.20 and those of FIG. 4(*b*) are labelled linearly from 41.40 to 41.70. The vertical axes on the total ion count and $BK^{2+}$ filtered ion count graphs of FIGS. 4(*a*) and (*b*) extend linearly from 0% to 100% on the vertical axes. The scales on the single scan spectrums of FIGS. 4(*a*) and (*b*) extend linearly from 0% to 100% on the vertical axes and linearly from 300 m/z to 1200 m/z on the horizontal axis The three labelled peaks of the single scan spectrum of FIG. 4(*a*) are at 457 m/z, 475 m/z and 531 m/z. The two labelled peaks of the single scan spectrum of FIG. 4(*b*) are at 425 m/z and 531 m/z.
Figure 4B:
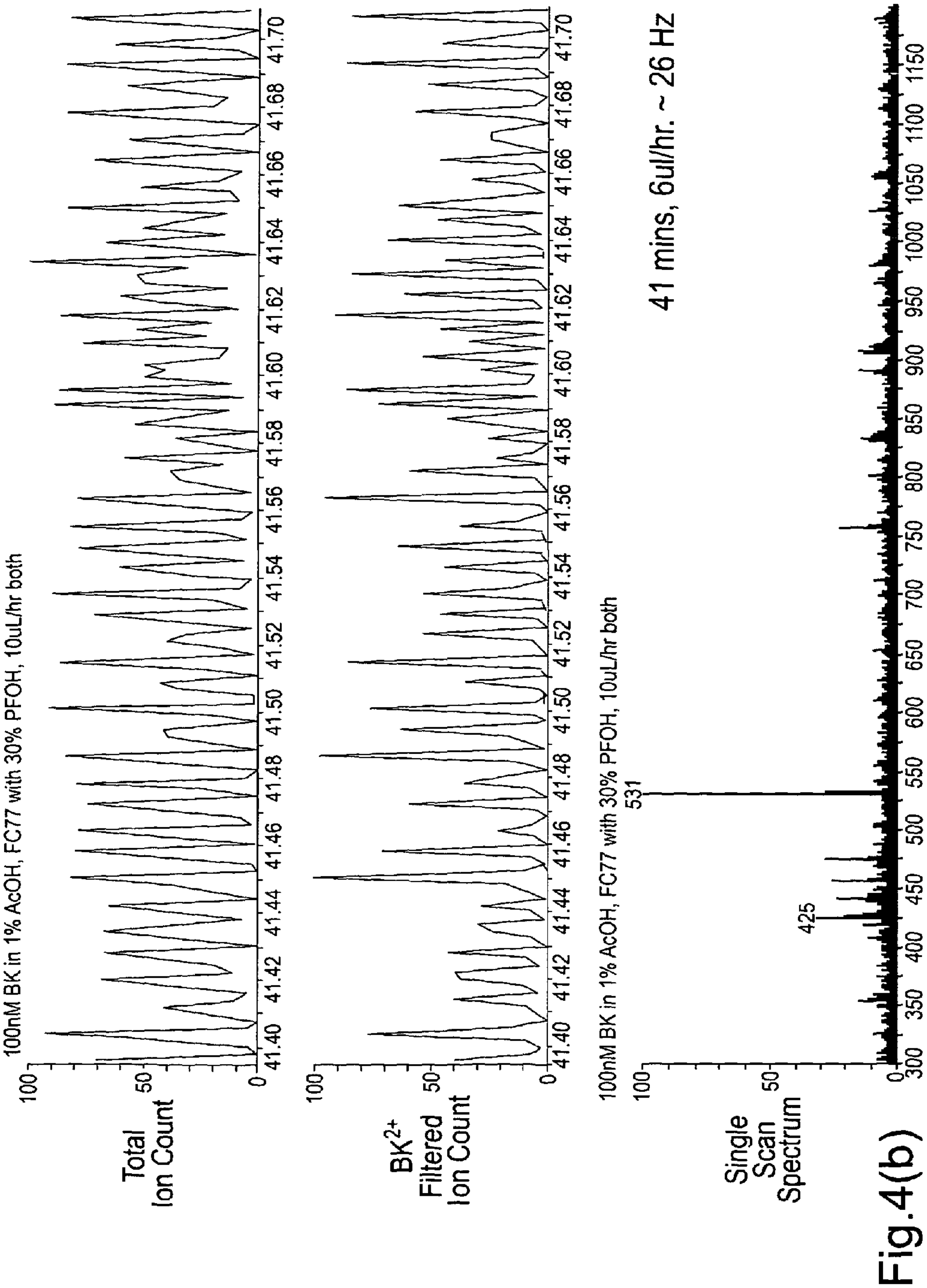

Having fabricated the device according to the details set out above, analyte has been detected at low concentration in intact microdroplets using ESI-MS. The data shown in FIGS. 4(*a*) and (*b*) were acquired over the course of an hour of continuous electrospray ionisation of aqueous microdroplets of 100 nM bradykinin peptide with 0.1% acetic acid. The carrier phase was 3M Fluorinert FC77 with 30% v/v 1H,1H,2H,2H perfluoro-1-octanol as a surfactant. The flow rates of aqueous and carrier phases were equivalent and varied from 9 to 5 μL/hr. A flow-rate dependence of the frequency and resolution for bradykinin peaks corresponding to individual microdroplets was observed. For the data shown in FIG. 4*b*, at an aqueous flow rate of 6 hr and an ESI scan-rate of 8.3 Hz, this corresponded to the detection of at most 20 attomoles of peptide per ESI scan at a microdroplet-throughput rate of approximately 2.6 Hz.

Figure 5:
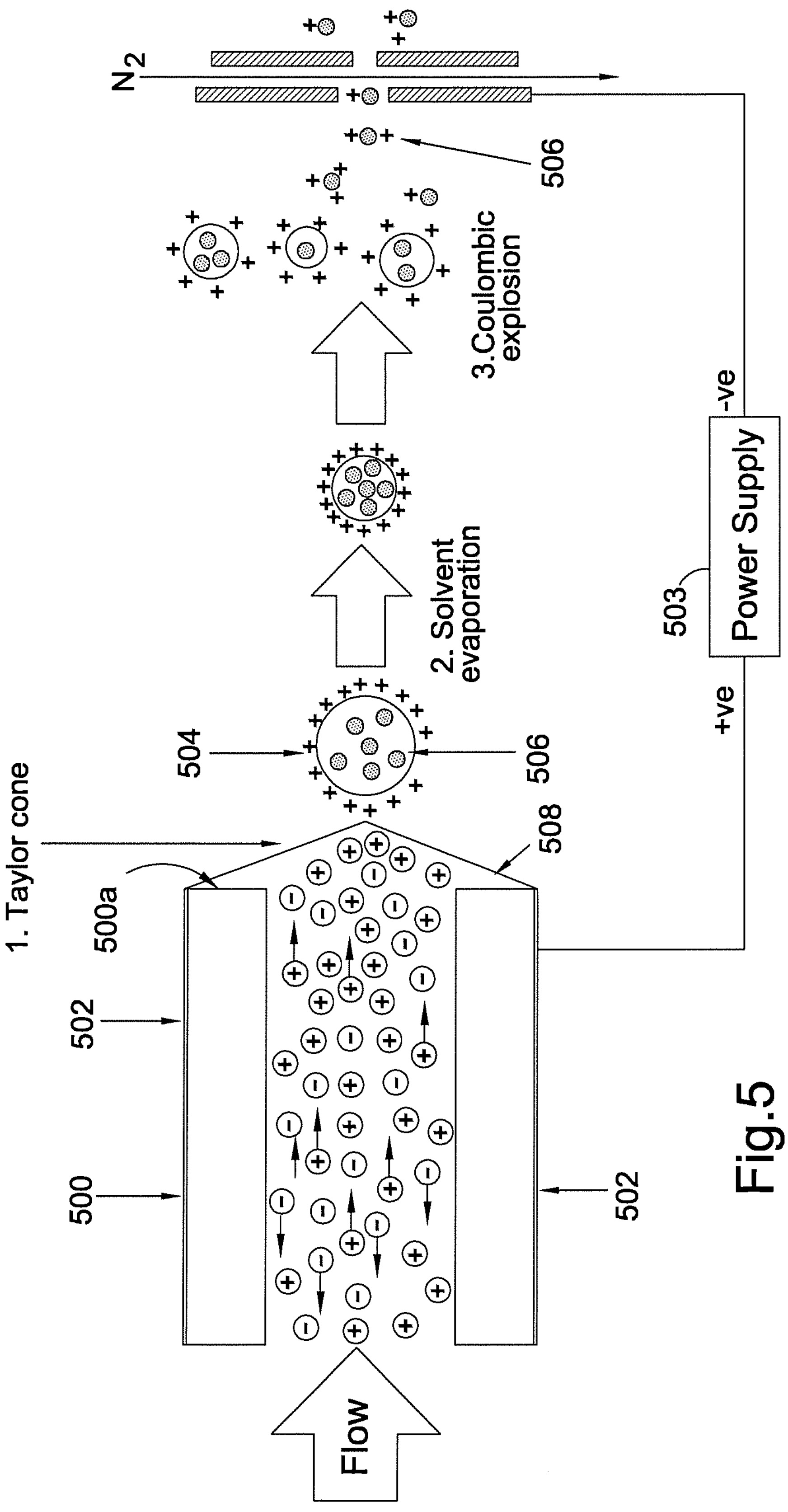
FIG. 5 shows a schematic drawing of three electrospray processes.
Figure 6:
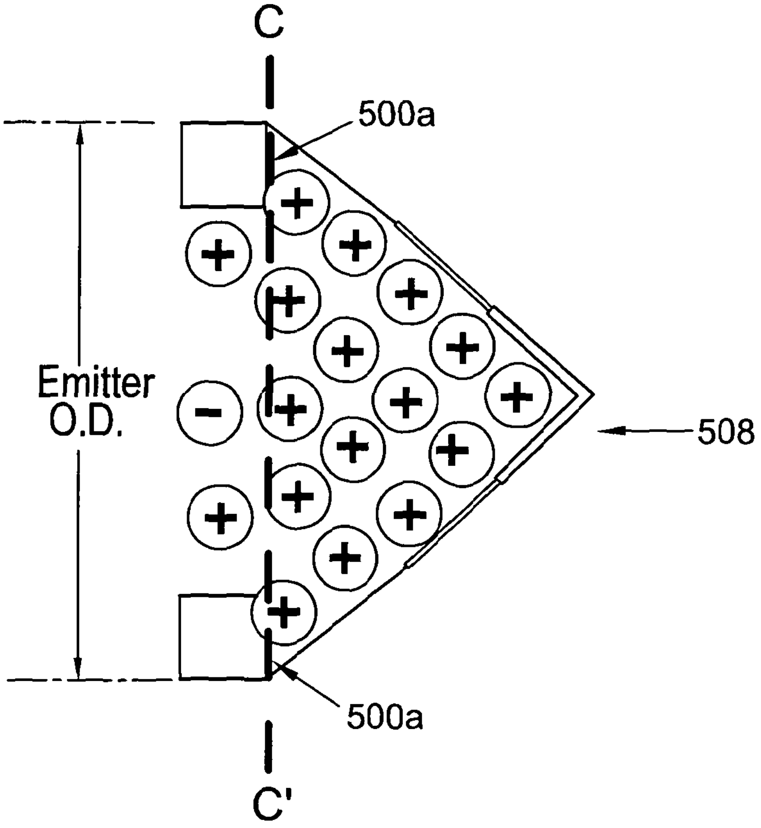
FIG. 6 shows a schematic diagram of a Taylor cone surface, wherein the base of the Taylor cone base is formed from the outside diameter of the emitter exit and not from the internal edge of the emitter orifice.

For assisting understanding of the above embodiments, FIG. 5 shows a schematic drawing of three electrospray processes that may be involved in the ESI-MS. The tip of an electrospray (silica) capillary emitter 500 has a gold coating 502 and a flat front face 500*a*. A power supply 503 provides a positive or negative potential difference between an electrically conductive coating 502 (for example of gold or conductive epoxy) and the inlet of the mass spectrometer. An expelled droplet positively charged spray droplet 504 comprising analyte 506 is expelled from a Taylor cone 508 (1), and then undergoes solvent evaporation (2) which concentrating the like (positive) charges which eventually results in a Coulombic explosion (3) leaving the analyte ions in the gas phase and able to enter and be detected by the mass spectrometer (which is under a slight vacuum). FIG. 6 shows the Taylor cone jet 508 in more detail: The positional stability of the contact line C-C' between the liquid and the emitter tip may affect the spray; and decreasing the flow rate may give smaller droplets in the cone jet. Spray droplets are emitted from a zone at the tip of the cone (highlighted).

Figure 7:
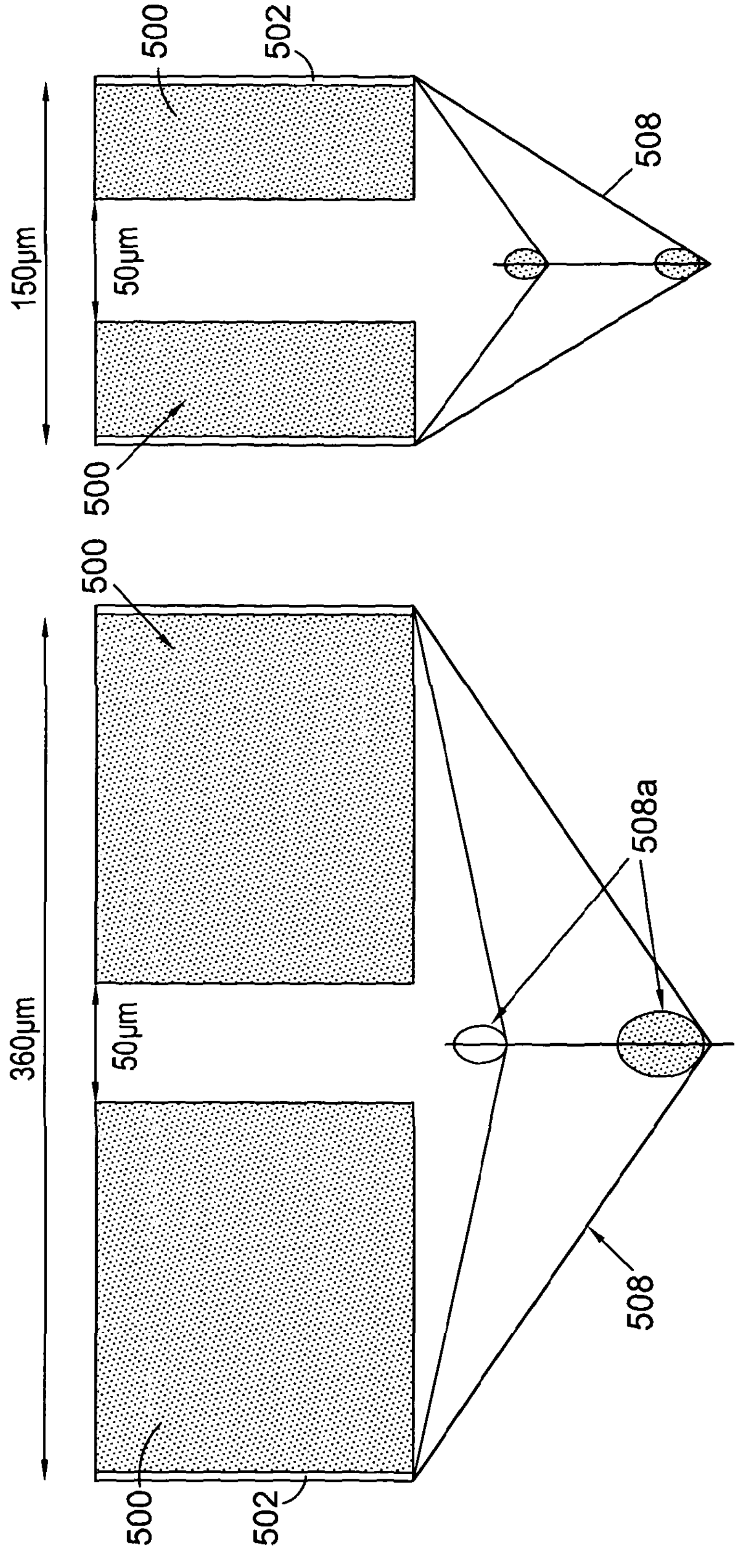
FIG. 7 shows a comparison on effect of capillary o.d. on microdroplet size, wherein a smaller capillary outer diameter (o.d.) gives smaller "spray microdroplets" and higher sensitivity, especially with lower flow rates (in embodiments, decreasing the inner diameter (i.d.) may further improve sensitivity)

FIG. 7 shows a comparison on effect of capillary outer diameter (o.d.), i.e., capillary aperture diameter, on microdroplet size. Decreasing the outer diameter (i.d.) apparently improves analyte detection sensitivity; the inner diameter may also have an effect. This may relate to a change in the angle of the peak of the Taylor cone formed at the end of the capillary. However, there may be an optimum such diameter, since too narrow an inner diameter may inhibit the microdroplets from entering the capillary at a stable or regular rate due to the increased back pressure of this geometric design. Optimised analyte detection sensitivity may be therefore achieved by providing an optimum i.d./o.d. and/or optimum back pressure, for example by controlling by a pressure or flow rate controller applied to the oil composition. Further in this regard, decreased i.d./o.d. may result in smaller microdroplets in the spray and thus produce more ions of the analyte molecules in the gas phase for detection in the MS. Thus, a finer thread, i.e., lower flow rate of the oil composition to the emitter may be preferable. The radius $r_e$ of the emission zone 508*a* of the Taylor cone 508 is also dependent on the flow rate according to $r_e \propto (\text{flowrate})^{2/3}$.

Preferably, the ESI-MS involves selecting an oil and/or surfactant that does not out-compete the analyte for ionisation. Example fluorous oils and surfactants are shown below:

TABLE

Examples of commercially available fluorous oils and small molecule surfactants

| Name | Formula | MW | Density ($gml^{-1}$) | BP (° C.) | Absolute Viscosity (cP) |
|---|---|---|---|---|---|
| FC-3283 | $N(C_3F_7)_3$ | 521 | 1.82 | 128 | 1.4 |
| FC-77 | C8-perfluoroalkane and perfluoro-cyclic ether | 416 | 1.78 | 102 | 1.3 |

TABLE-continued

| Examples of commercially available fluorous oils and small molecule surfactants | | | | | |
|---|---|---|---|---|---|
| Name | Formula | MW | Density ($gml^{-1}$) | BP (° C.) | Absolute Viscosity (cP) |
| perfluorooctane | $C_8F_{18}$ | 438 | 1.77 | 103-104 | — |
| HFE-7100 | $C_4F_9OCH_3$ | 250 | 1.51 | 61 | 0.58 |
| HFE-7300 | $C_7H_3F_{13}O$ | 350 | 1.66 | 98 | 1.18 |
| HFE-7500 | $C_9H_5F_{15}O$ | 414 | 1.61 | 128 | 1.24 |
| FC-40 | $N[(C_4F_9)_3$ & $CF_3N(C_4F_9)_2$ | average 650 | 1.86 | 155 | 4.1 |
| 1H,1H,2H,H-perfluorooctan-1-ol | $C_8H_5F_{13}O$ | 364 | 1.65 | 88-95/28 mmHg | — |
| Perfluorooctanoic acid | $C_8HF_{15}O_2$ | 414 | Solid (mp 55-56° C.) | 189/736 mmHg | — |

TABLE

Structures of fluorous oils and surfactants

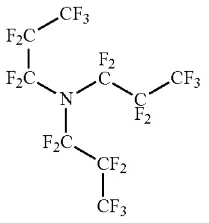

3M Fluorinert FC-3283

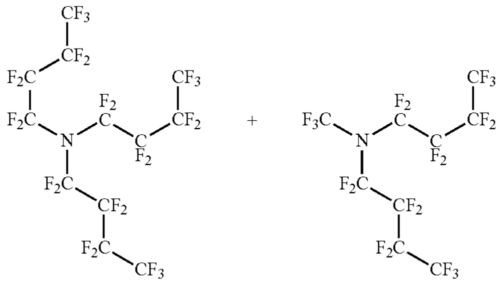 [SMILES: FC(F)(F)C(F)(F)C(F)(F)C(F)(F)N(C(F)(F)C(F)(F)C(F)(F)C(F)(F)F)C(F)(F)C(F)(F)C(F)(F)C(F)(F)F ; FC(F)(F)N(C(F)(F)C(F)(F)C(F)(F)C(F)(F)F)C(F)(F)C(F)(F)C(F)(F)C(F)(F)F]

3M Fluorinert FC-40

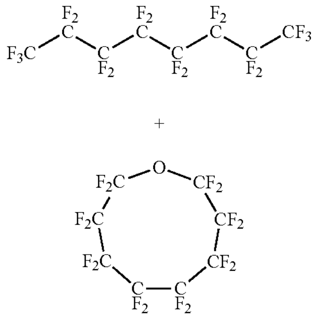 [SMILES: FC(F)(F)C(F)(F)C(F)(F)C(F)(F)C(F)(F)C(F)(F)C(F)(F)C(F)(F)F ; FC1(F)OC(F)(F)C(F)(F)C(F)(F)C(F)(F)C(F)(F)C(F)(F)C1(F)F]

3M Fluorinert FC-77

TABLE-continued

Structures of fluorous oils and surfactants

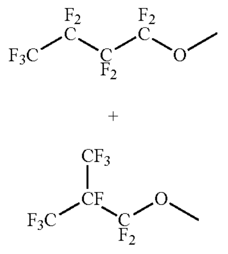

3M Novec HFE-7100

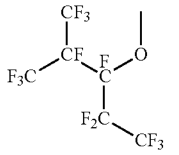

3M Novec HFE-7300

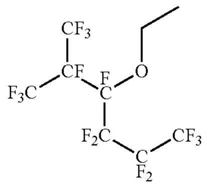

3M Novec HFE-7500

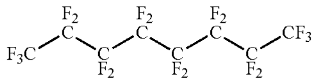

Perfluorooctane

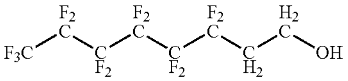

1H,1H,2H,2H-perfluorooctan-1-ol

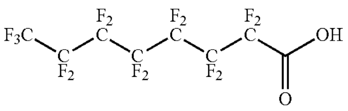

perfluorooctanoic acid

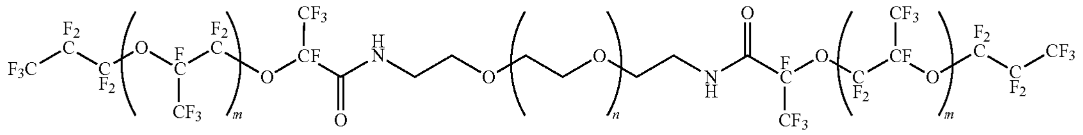

RainDance Technologies EA surfactant

As examples of further alternative or additional features and advantages of the above embodiments, we note that experiments have involved:

microdroplets with 360 um o.d.×50 um i.d., and 1 mg/ml PFOA in perfluorooctane (PFO) 60 uL/h, 5 um bradykinin 60 uL/h;

an average of 20-40 scans from microdroplets made by a HPLC T-junction source temperature 20° C., bradykinin 5 μM, and obtaining spectra corresponding to, respectively, HFE7500 (no surfactant) and to FC77 with 0.5% surfactant, and, in comparison, increased detection peaks of Bradykinin $M^{2+}$ in spectra of FC77 with 30% perfluorooctanol and of FC40 with 30% perfluorooctanol;

an average of 20-40 scans from microdroplets made by a HPLC T-junction at source temperature 20° C., bradykinin 5 μM, and obtaining spectra corresponding to FC77 (no surfactant) and with and, in comparison, increased detection peaks of Bradykinin $M^{2+}$ in spectra corresponding to FC77 with 30% perfluorooctanol, FC40 no surfactant, and to FC40 with 30% perfluorooctanol;

an average of 34-46 scans from emitter chip 360 μm×50 μm (o.d.×i.d.) with source 20° C. and surfactant=perfluorooctanoic acid (PFOA), 5 μM bradykinin, and obtaining spectra corresponding to 1.0 mg/ml PFOA in FC77 and, with an increased detection peak of Bradykinin $M^{2+}$, 0.5 mg/ml PFOA in perfluorooctane;

Measurement of spectrum corresponding to 5 μM bradykinin, ca. 2 nL microdroplets=10 fmoles;

changing the source temperature to 100° C.—reverses observations at 20° C., using 1 mg/ml perfluorooctanoic acid as surfactant; spectra obtained from these experiments suggested that FC40 may be reasonable whereas perfluorooctane is a poorer solvent for this surfactant;

Total ion current—1 mg/ml PFOA in FC40 & 1 μM bradykinin, source temperature 100° C., and optionally Mass range 530-531, the spectra associated with imperfect microdroplets leading to use of FC40 type oil and a change of surfactant;

microdroplet Formation at T-junction, involving FC3283 with 30% v/v perfluorooctanol, with flow rate 20 μl/hr, 0.1% acetic acid in water, and stable mono-disperse microdroplets with 11.5 Hz microdroplet formation rate;

microdroplet Flow at PDMS-Capillary Junction, FC3283 with 30% v/v perfluorooctanol, flow rate 20 μl/hr, 0.1% acetic acid in water, and stable mono-disperse microdroplets with 11.5 Hz microdroplet formation rate, the microdroplets moving from 20 μm channel into 50 μm i.d. capillary and retaining spacing in capillary;

single-microdroplet ESI-MS, measuring total ion current against time, $BK^{2+}$ 530-532 m/z ion current against time, and a single scan spectrum having a maximum detection peak at $BK^{2+}$ 530-532 m/z, conditions being: oil FC3283 with 23% perfluorooctanol; aqueous 500 nM BK with 1% AcOH, flow rate of both channels 5 uL/hr, microdroplet formation rate 1.5 Hz and ESI-MS scan rate 5 Hz; and single-microdroplet ESI-MS, measuring total ion current against time, $BK^{2+}$ 530-532 m/z ion current against time, and a single scan spectrum having a maximum detection peak at $BK^{2+}$ 530-532 m/z, conditions being: oil FC3283 with 30% perfluorooctanol; aqueous 100 nM BK with 1% AcOH, flow rate of both channels 10 uL/hr, microdroplet formation rate ~1 Hz and ESI-MS scan rate 5 Hz.

It is further noted that changing surfactant concentration affects microdroplet formation rate, as indicated for example in the Table below. In this regard, FC3283 and PFOA generally did not give mono-disperse microdroplets in experiments, and may form a salt. A preferred embodiment uses FC3283 with PFOH. A further embodiment may use FC77 with PFOH in the MS.

TABLE

Changing surfactant concentration affects microdroplet formation rate

| Fluorous oil | Surfactant | Ratio | Concentration | Flow rate Oil (μl) | Flow rate Aqueous (μl) | Microdroplet Rate (Hz) | Microdroplet Volume (nL) |
|---|---|---|---|---|---|---|---|
| FC3283 | PFOA | | 1 mg/mL | 20 | 20 | 2.28 | 2.4 |
| FC3283 | PFOH | 16.7% | | 20 | 20 | 7.64 | 0.73 |
| FC3283 | PFOH | 30% | | 20 | 20 | 11.49 | 0.48 |
| FC3283 | PFOH | 16.7% | | 25 | 25 | 12.86 | 0.54 |
| FC3283 | PFOH | 30% | | 25 | 25 | 12.86 | 0.54 |
| FC77 | PFOH | 30% | | 20 | 20 | 5.36 | 1.04 |
| FC77 | PFOH | 30% | | 30 | 30 | 9.91 | 0.84 |

In view of the foregoing paragraphs of the detailed description, embodiments of the microdroplet ESI-MS may provide one or more of the following advantages in any combination:

- a sensitive technique that substantially does not rely on a change in fluorescence;
- detection of a property or change in a chemical or biological reaction, e.g., a ratio of starting material(s) to product(s);
- confirmation of the compound identity in a compound fluorescence based screening assay, e.g. Thermal Shift Assay, 1050 determination;
- ability to use a library of microdroplets which could contain single or multiple compounds either in solution or initially screened on a solid support or bead prior to release in to solution for compound identification;
- identification of multiple compounds simultaneously, for example dependent on their concentrations and/or sensitivity of technique;
- interrogation of molecules excreted from living cells, e.g., cell signalling molecules, proteins etc.;
- detection of a compound bound to a protein target;
- increased analyte sensitivity, e.g., below 1 μM and/or improved analyte sensitivity of a microdroplet de-emulsification procedure.
- better sensitivity, e.g., 200 nM;
- single microdroplet sensitivity with alternating contents; and/or
- formation of microdroplets on one device and transfer either immediately or stored for subsequent MS analysis on another device.

Further additionally or alternatively, the embodiments may have one of more of the following properties/advantages in any combination:

- mass spectrometry (MS) and microdroplet compatible oil and surfactant;
- gives mono-disperse microdroplets of desired size;
- presence of organic modifiers to lower surface tension;
- improved designs, e.g., easier making and aligning, of two-piece PDMS devices, zero dead volume capillary fitting and elimination of leakage in the capillary holder;
- a step to accurately cut capillaries to ensure flat surfaces both ends and with minimal damage to the polyimide coating prior to further processing;

- a process following cutting to polish the capillaries to a flat end, using a powered polishing disc or sets of discs and in so doing produce a roughened surface, which may prove beneficial;
- use of a conductive wire and conductive epoxy to aid a stable ionisation potential to be applied to the conductive surface of the emitter and significantly stiffen its mechanical properties;
- optimum emitter performance design characteristics versus back-pressure or droplet throughput to balance higher sensitivity versus shorter device lifetime;
- a stable Taylor cone, though this may in other embodiments form and disappear many times per second; and/or
- control of microdroplet size and frequency to match MS scan rate.

Microfluidic Droplet Mass Spectrometry System

Figure 8:
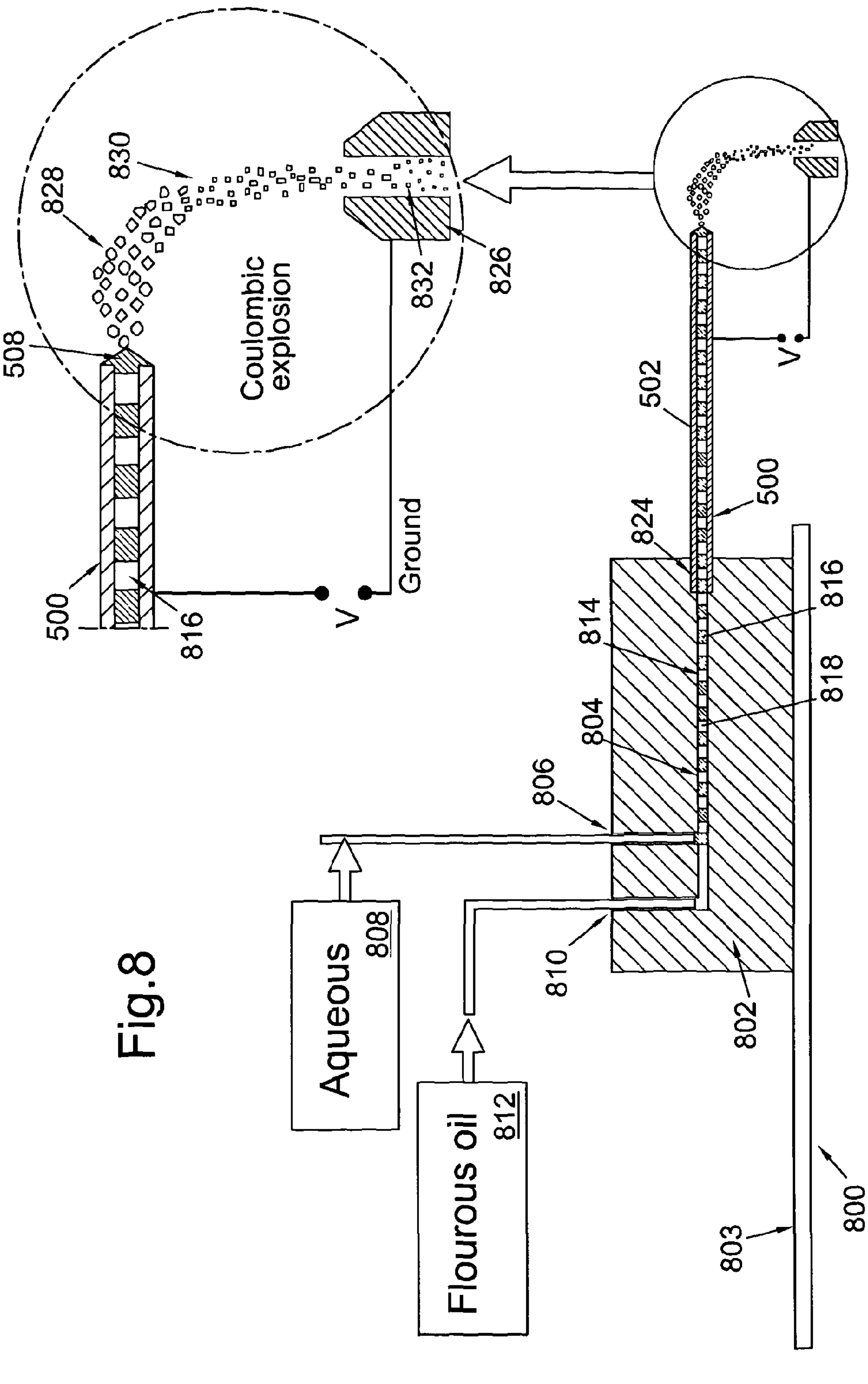
FIG. 8 shows an embodiment of microfluidic droplet mass spectrometry system according to an aspect of the invention.

Referring now to FIG. 8, this shows a schematic diagram of a microfluidic droplet mass spectrometry system 800 according to an embodiment of the invention. A microfluidic device 802, for example of the general type illustrated in FIGS. 1 and 2, comprises upper and lower PMDS layers (not shown separately) each of which has a recessed pattern in its surface, the layers fitting together to define a microfluidic channel 804. The device is preferably supported on a substrate 803 such as a glass slide. The device has one or more inlet ports 806 for an aqueous solution of the analyte 808, and one or more ports 810 to receive fluorous oil 812. In an embodiment the aqueous solution and fluorous oil may each be delivered via a controllable pump such as a syringe pump (not shown in the Figure, for clarity) via flexible tubing which inserts into a respective port. The microfluidic device may include a flow focussing device, for example of the type illustrated in FIG. 2*c*, to generate a stream of emulsion 814 comprising aqueous droplets 816 in fluorous oil 818. Optionally the channel 804 may include a meandering delay line 820, illustrated in plan view in FIG. 2*c*. A capillary emitter 500, for example as previously described, is inserted into the microfluidic chip 802, facilitated by a scalloped capillary fitting 824 as illustrated, for example, in FIG. 2*e*. Optionally channel 804 may taper towards this fitting. A power supply, 'V', applies a potential between the conductive outer coating 502 of emitter 500 and the inlet of the mass spectrometer, in embodiments the metal source cone 826 of the mass spectrometer. The inset in FIG. 8 shows an expanded view of the emitter tip and mass spectrometer inlet.

In operation the pumps force the emulsion stream 814 out of the tip of the emitter 500 where a tailor cone 508 is formed and droplets 828 are electrosprayed from this, evaporate and undergo a coulombic explosion 830 as illustrated in FIG. 5 to provide analyte molecules 832 in gas phase, from a single droplet at a time, at the inlet 826 of the mass spectrometer. The potential difference between the mass spectrometer inlet and the outer conductive coating of the emitter is used to turn the electrosprayed droplets through an angle, in the illustrated embodiment 90°, so that these do not spray directly into the inlet of the mass spectrometer. In embodiments the conductive coating 502 is at a positive potential with respect to the grounded inlet of the mass spectrometer, but a negative potential may also be employed. In embodiments the inlet of the mass spectrometer is maintained under a slight vacuum, for example of order 15 mm Hg.

Referring now to FIG. 9, this illustrates an example of the microfluidic chip 802 showing channels in the lower portion of the chip and inset, in the upper portion of the chip. Like elements to those previously described are indicated by like reference numerals. The upper portion of the chip is flat to define channels with a rectangular cross section, apart from the scalloped capillary fitting 824, which is configured, in embodiments, to receive a circular cross-section capillary.

Droplet Re-Injection

We next describe one particularly advantageous embodiment, which begins with preparation of monodisperse droplets of desired size for analysis on a mass spectroscopy re-injection chip, using a flow focus device with a neutral biocompatible polymeric surfactant. These monodisperse droplets are stored and incubated either on-chip, in tubing (PEEK, PTFE, PE or silica capillary) or stored in a syringe (glass or plastic) or in a glass or plastic vial. In the design of the reinjection method it is important that the emulsion does not come into contact with a surface with high surface energy (e.g. metal), as this can cause droplets in close proximity to coalesce.

After a set period of time (which may be several hours to many days) the stored emulsion is injected into a mass spectroscopy re-injection chip. In its simplest form the reinjection chip is a derivative of a MS T-junction chip, but one preferably where the angle between the two channels is in the range 15-60°.

The droplets, stabilised by a good polymeric surfactant, are pushed down the central channel and the diluting oil, or a solvent containing a poor surfactant, joins the main channel at a shallow angle (<60°). As the neutral non-amide containing polymeric surfactant may ionise in the mass spectrometer, it is diluted with a poorly ionising volatile fluorous oil and surfactant, e.g. 1H,1H,2H,2H-perfluorooctanol 30% (vol:vol) in FC3283. Surprisingly PFOH (or similar) has been found sufficient to stabilise the droplets as they are spaced apart by the dilution process.

The aqueous droplets (0.1-1.5 nL), stabilised with a biocompatible polymeric surfactant (0.5-2.5%; w:w), in a volatile fluorous oil, e.g. FC-3283, FC-77 or perfluorooctane, are slowly pushed down the main channel. A side-channel joins the main channel at a shallow angle (for example 15-60°) which carries the diluting oil and, optionally, a more MS invisible surfactant than the initial polymeric surfactant. This allows the reinjection rate of the droplets to be controlled simply by the emulsion flow rate and that of the volatile diluting oil/surfactant mixture pushing the droplets into the capillary. As a result the flow rate of the diluting oil/surfactant mixture not only sets the time period between individual droplets entering into the capillary, but also the amount of displacement (removal) of the original surfactant, or the amount of dilution that can take place of the heavy polymeric surfactant, by a small molecule surfactant competing with the heavy surfactant at the droplet interface.

Figure 10A:
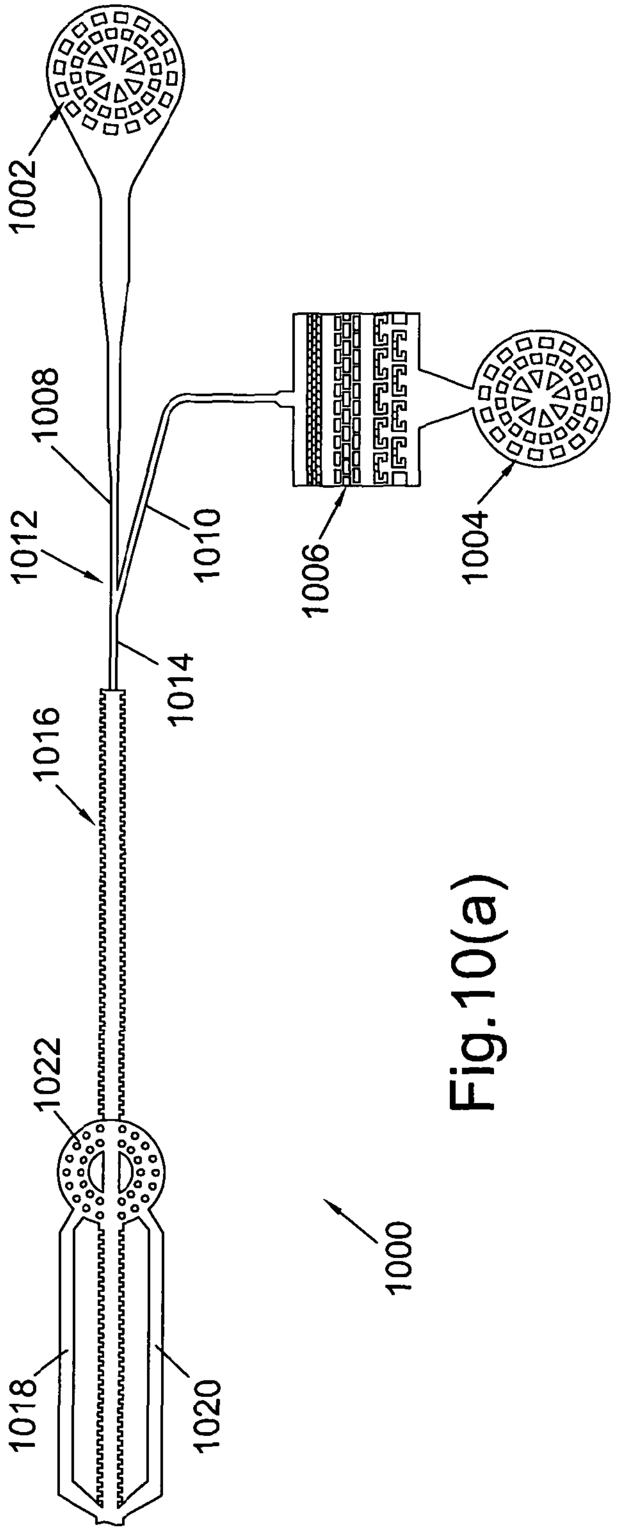
FIGS. 10(*a*) and (*b*) show, respectively, a view of a droplet re-injection chip for use in microfluidic droplet mass spectrometry apparatus according to an embodiment of the invention, and photographs illustrating the chip of FIG. 10(*a*) in use.
Figure 10B:
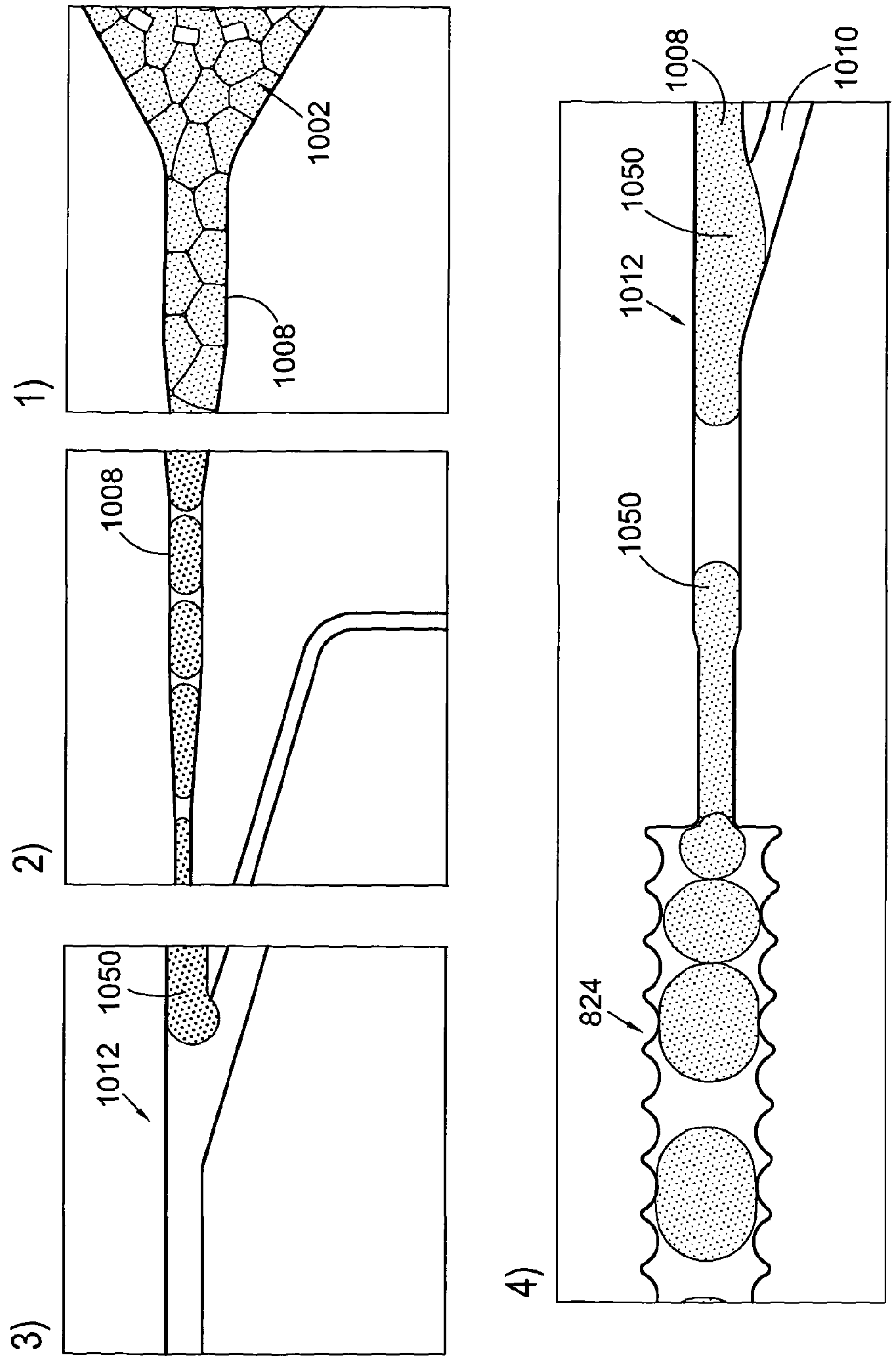

Referring now to FIGS. 10*a* and 10*b*, FIG. 10*a* shows a design drawing of (the top portion of) a microfluidic device 1000 which may be employed for droplet re-injection (effectively a view of a transverse section through the device; the bottom half of the design, a capillary holder, is not shown). FIG. 10*a* illustrates the inlet ports and channels of the microfluidic device into which a capillary emitter (not shown) is inserted. The device comprises a first inlet 1002 to receive a re-injected emulsion (the pattern within illustrates optional alignment studs). A second inlet port 1004 receives a diluting liquid such as oil or a solution of surfactant in oil, for example 30% vol:vol PFOH in FC-3283. This is optionally passed through an on-chip passive filter 1006. A first channel 1008 from first inlet 1002 and a second channel 1010 from second inlet 1004 meet at a Y-junction 1012, merging at an acute angle into an output channel 1014 which provides an output flow to the emitter. Thus channel 1014 may progress to a capillary fitting region 1016. In embodiments a capillary is inserted into region 1016 together with de-gassed PDMS (polydimethylsiloxane) and side channels 1018, 1020 and dispersion region 1022 may be provided to facilitate the escape of un-wanted PDMS as the capillary is inserted.

Referring now to FIG. 10*b*, this shows the device of FIG. 10*a* in operation, successive micro photographs (1) to (4) illustrating successive regions of the device and stages in the processing of the re-injected droplets. Thus in photo (1) it can be seen that the droplets are very closely spaced but separate a little as they progress down the narrowing, tapered inlet of channel 1008 (photo (2)). Photo (3) shows an individual droplet 1050 beginning to pass the location where the oil/surfactant flow from channel 1010 merges, and photo (4) indicates a later stage in this process in which the droplet is progressing past channel 1010. From photo (4) it can be appreciated that the oil, and optional surfactant, flowing in channel 1010 will partially displace the surfactant on droplet 1050. It can further be seen that the effect of the merging flow from channel 1010 is to increase the droplet spacing following Y-junction 1012, and by controlling the rate of injection of oil into port 1004, the spacing between droplets can be controlled. This in turn facilitates obtaining a series of mass spectra in which each one or a few captured mass spectra relate to analyte in only single droplet.

The substances which can be analysed by the above described techniques include, but are not limited to: lipids, nucleic acids, carbohydrates, chemicals, compounds, ions, elements, drugs, proteins, enzymes, antibodies, peptides, lipids, nucleic acids, metabolites, carbohydrates, glycoproteins, metal-chelators, peptide or protein metal-chelators which may or may not be fluorescent, and catalysts, as well as macromolecular materials such as polymers, beads, nanomaterials, gels and the like. In principle the microdroplets may be employed to carry living biological material such as cells, bacteria, small organisms, algae and the like, although preferably the use of growth medium should be avoided as this contains metal ions and if growth medium is present in a droplet these ions can give rise to an unwanted background signal in the mass spectrometer. Embodiments of the techniques we describe may be combined with other microdroplet processing techniques, for example (but not limited to) selective sorting using fluorescence detection and/or electrostatic deflection, pre-concentration, and the like.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of detecting analyte by mass spectrometry, the method comprising:

providing a composition comprising oil and an aqueous microdroplet comprising said analyte, said composition comprising surfactant to stabilise said aqueous microdroplet in said composition, wherein said surfactant comprises one of a polymeric surfactant or a small molecule surfactant, wherein said polymeric surfactant is less ionisable than said analyte, wherein said small molecule surfactant comprises a volatile small molecule surfactant that has a molecular weight that is less than 800 g/mol, wherein said oil is less ionisable than said analyte;

injecting said composition comprising said oil, said aqueous microdroplet comprising said analyte, and said surfactant into a mass spectrometer from an emitter or orifice of a microfluidic device; and performing ionisation mass spectrometry analysis of said analyte, wherein, as a result of a higher ionisation potential of said surfactant and said oil compared to said analyte and during the step of performing said ionisation mass spectrometry analysis, a first portion of available charge to allow ionisation of said analyte is greater than a second portion of the available charge to allow ionisation of said surfactant and said oil.

2. A method as claimed in claim 1, wherein said ionisation mass spectrometry comprises electrospray ionisation of said composition.

3. A method as claimed in claim 1, the method further comprising:

mixing said surfactant-stabilised aqueous microdroplet in said oil with a diluting oil or oil solution to at least partially displace the surfactant from said microdroplet, prior to performing said ionisation mass spectrometry.

4. A method as claimed in claim 3, wherein said oil solution is a solution comprising a second surfactant to at least partially displace the original surfactant.

5. A method as claimed in claim 4, wherein said second surfactant is less ionisable than said original surfactant.

6. A method as claimed in claim 4, wherein the original surfactant is a polymeric surfactant and said second surfactant is non-polymeric.

7. A method as claimed in claim 3, wherein said diluting oil or oil solution comprises a fluorous oil or a solution comprising a second surfactant in a fluorous oil.

8. A method as claimed in claim 3, further comprising controlling a proportion of said displacement of said surfactant by controlling a flow rate of said diluting oil or oil solution mixing with said surfactant-stabilised aqueous microdroplet in said oil.

9. A method as claimed in claim 3, wherein said mixing comprises flowing said diluting oil or oil solution into a flow of said surfactant-stabilised aqueous microdroplet in said oil at an acute angle to a direction of said flow of said surfactant-stabilised aqueous microdroplet in said oil.

10. A method as claimed in claim 3, further comprising performing said mixing on a microfluidic device.

11. A method as claimed in claim 1, further comprising controlling a rate at which said microdroplet is provided to said mass spectrometer performing said ionisation mass spectrometry by controlling a flow rate of a diluting oil or oil solution mixing with said surfactant-stabilised aqueous microdroplet in said oil to control a spatial separation of said microdroplet to a second microdroplet in a flow provided to said mass spectrometer after said mixing.

12. A method as claimed in claim 11, wherein said mixing provides an output flow of said surfactant-stabilised aqueous microdroplet in said oil, the method further comprising controlling one or both of a rate of said output flow and a rate of capturing spectrometry spectra of evaporated material from said output flow, such that on average each captured mass spectrum comprises a spectrum of the contents of no more than a single said microdroplet.

13. A method as claimed in claim 12, further comprising averaging a plurality of said mass spectra from a plurality of droplets containing substantially the same material to reduce background noise from said surfactant.

14. A method as claimed in claim 1, wherein said oil comprises fluorous oil.

15. A method as claimed in claim 1, further comprising distinguishing said microdroplet from a second microdroplet.

16. A method as claimed in claim 1, further comprising acquiring a plurality of electrospray ionisation mass spectrometry spectra to distinguish said microdroplet from another said microdroplet.

17. A method as claimed in claim 1, used for performing ionisation mass spectrometry of the contents of a microdroplet water-in-oil emulsion of said composition, the method further comprising:

providing the microdroplet with a second surfactant layer to stabilise said microdroplet; and providing the microdroplet with said second surfactant layer to said mass spectrometer for analysis of said contents.

18. A method as claimed in claim 17, further comprising:

generating a spray from a stream of a plurality of microdroplets for injection into said mass spectrometer, wherein said plurality of microdroplets includes said surfactant-stabilised aqueous microdroplet.

19. A method as claimed in claim 17, the method further comprising:

mixing said microdroplet in said oil with a diluting oil or oil solution to at least partially displace the second surfactant from said microdroplet, prior to performing said ionisation mass spectrometry.

20. A method as claimed in claim 19, wherein said diluting oil or oil solution is a solution comprising said second surfactant to at least partially displace the original surfactant.

21. A method as claimed in claim 20, wherein said second surfactant is less ionisable than said original surfactant.

22. A method as claimed in claim 20, wherein the original surfactant is a polymeric surfactant and said second surfactant is non-polymeric.

23. A method as claimed in claim 19, wherein said diluting oil or oil solution comprises a fluorous oil or a solution comprising said second surfactant in a fluorous oil.

24. A method as claimed in claim 19, further comprising controlling a proportion of said displacement of said second surfactant by controlling a flow rate of said diluting oil or oil solution mixing with said microdroplet in said oil.

25. A method as claimed in claim 19, further comprising performing said mixing on a microfluidic device.

26. A method as claimed in claim 17, wherein said mixing comprises flowing said diluting oil or oil solution into a flow of said microdroplet in said oil at an acute angle to a direction of said flow of said microdroplet in said oil.

27. A method as claimed in claim 17, further comprising controlling a rate at which said microdroplet is provided to said mass spectrometer performing said ionisation mass spectrometry by controlling a flow rate of a diluting oil or oil solution mixing with said microdroplet in said oil to control a spatial separation of said microdroplet to a second microdroplet in a flow provided to said mass spectrometer after said mixing.

28. A method as claimed in claim 27, wherein said mixing provides an output flow of a plurality of microdroplets in said oil, wherein said plurality of microdroplets includes said surfactant-stabilised aqueous microdroplet, the method further comprising controlling one or both of a rate of said output flow and a rate of capturing spectrometry spectra of evaporated material from said output flow, such that on average each captured mass spectrum comprises a spectrum of the contents of no more than a single said microdroplet.

29. A method as claimed in claim 28, further comprising averaging a plurality of said mass spectra from a plurality of droplets containing substantially the same material to reduce background noise from said surfactant.

30. The method as claimed in claim 1, wherein said surfactant has a molecular weight that is less than 600 g/mol.

31. The method as claimed in claim 1, wherein said surfactant has a molecular weight that is less than 400 g/mol.

* * * * *